United States Patent
Kopanski et al.

(10) Patent No.: US 12,202,177 B2
(45) Date of Patent: Jan. 21, 2025

(54) MOLDING RESIN TO FORM CONTINUOUS STRUCTURES

(71) Applicant: Velcro IP Holdings LLC, Manchester, NH (US)

(72) Inventors: Gregory K. Kopanski, Candia, NH (US); Stephen R. Arata, Kingston, NH (US); Charles S. White, Danvers, MA (US)

(73) Assignee: Velcro IP Holdings LLC, Manchester, NH (US)

( * ) Notice: Subject to any disclaimer, the term of this patent is extended or adjusted under 35 U.S.C. 154(b) by 0 days.

(21) Appl. No.: 18/425,189

(22) Filed: Jan. 29, 2024

(65) Prior Publication Data

US 2024/0262020 A1 Aug. 8, 2024

Related U.S. Application Data

(60) Continuation of application No. 17/308,137, filed on May 5, 2021, now Pat. No. 11,981,057, which is a
(Continued)

(51) Int. Cl.
*B29C 43/22* (2006.01)
*A44B 18/00* (2006.01)
(Continued)

(52) U.S. Cl.
CPC ........ *B29C 43/222* (2013.01); *A44B 18/0015* (2013.01); *A44B 18/0049* (2013.01);
(Continued)

(58) Field of Classification Search
CPC ............ A44B 18/0046; A44B 18/0049; A44B 18/0053; A44B 18/0061; A44B 18/0057; A44B 18/0067
See application file for complete search history.

(56) References Cited

U.S. PATENT DOCUMENTS

| 3,085,292 A | 4/1963 | Kindseth |
| 3,230,134 A | 1/1966 | Studer |

(Continued)

FOREIGN PATENT DOCUMENTS

| CN | 1143483 | 2/1997 |
| CN | 1255886 | 6/2000 |

(Continued)

OTHER PUBLICATIONS

CN Office Action in Chinese Appln. No. 201880087427.6, dated Nov. 30, 2021, 19 pages (with English Translation).
(Continued)

*Primary Examiner* — Timothy Kennedy
(74) *Attorney, Agent, or Firm* — Fish & Richardson P.C.

(57) ABSTRACT

A molding apparatus includes a movable molding surface with molding cavities, a pressure shoe with a stationary outer surface that defines in cooperation with the molding surface a pressure zone, and a resin source configured to introduce molten resin into the pressure zone to be forced into the molding cavities by pressure in the pressure zone. The molding surface is movable with respect to the pressure shoe to introduce molding cavities to the pressure zone to be filled with resin while the outer surface of the pressure shoe and the molding surface define in between an entrance gap of decreasing width upstream of the pressure zone. The outer surface of the pressure shoe is spaced from the molding surface in the pressure zone to define a minimum gap at which the outer surface of the pressure shoe has a slope parallel to the molding surface. The pressure shoe is adapted to be held in a flexed condition against resin in the pressure zone while forcing resin into the cavities, with the outer surface of the pressure shoe curved upstream of the pressure zone.

25 Claims, 18 Drawing Sheets

Related U.S. Application Data division of application No. 16/225,331, filed on Dec. 19, 2018, now Pat. No. 11,027,463.

(60) Provisional application No. 62/608,622, filed on Dec. 21, 2017.

(51) Int. Cl.
| | |
|---|---|
| *B29C 43/34* | (2006.01) |
| *B29C 43/46* | (2006.01) |
| *B29C 43/48* | (2006.01) |
| *B29C 43/50* | (2006.01) |
| *B29C 43/28* | (2006.01) |
| *B29K 23/00* | (2006.01) |
| *B29K 77/00* | (2006.01) |
| *B29L 31/00* | (2006.01) |

(52) U.S. Cl.
CPC .......... *A44B 18/0061* (2013.01); *B29C 43/34* (2013.01); *B29C 43/46* (2013.01); *B29C 43/48* (2013.01); *B29C 43/50* (2013.01); *B29C 43/28* (2013.01); *B29C 2043/3438* (2013.01); *B29C 2043/3466* (2013.01); *B29C 2043/3483* (2013.01); *B29C 2043/465* (2013.01); *B29C 2043/486* (2013.01); *B29C 2043/5084* (2013.01); *B29K 2023/0625* (2013.01); *B29K 2023/12* (2013.01); *B29K 2077/10* (2013.01); *B29L 2031/729* (2013.01)

(56) References Cited

U.S. PATENT DOCUMENTS

| | | | |
|---|---|---|---|
| 3,312,583 | A | 4/1967 | Rochlis |
| 3,365,352 | A | 1/1968 | Burleigh et al. |
| 3,386,876 | A | 6/1968 | Wyckoff |
| 3,387,069 | A | 6/1968 | Stohr |
| 3,394,431 | A | 7/1968 | Nalle, Jr. |
| 3,505,157 | A | 4/1970 | Fields et al. |
| 3,515,778 | A | 6/1970 | Fields et al. |
| 3,554,853 | A | 1/1971 | Mercer et al. |
| 3,782,872 | A | 1/1974 | Nalle, Jr. |
| 4,001,366 | A | 1/1977 | Brumlik |
| 4,097,634 | A | 6/1978 | Bergh |
| 4,732,800 | A | 3/1988 | Groshens |
| 4,775,310 | A | 10/1988 | Fischer |
| 5,179,767 | A | 1/1993 | Allan |
| 5,267,816 | A | 12/1993 | Mercer et al. |
| 5,348,788 | A | 9/1994 | White |
| 5,368,549 | A | 11/1994 | McVicker |
| 5,441,687 | A | 8/1995 | Murasaki et al. |
| 5,620,769 | A | 4/1997 | Wessels et al. |
| 5,690,875 | A | 11/1997 | Sakakibara et al. |
| 5,744,080 | A | 4/1998 | Kennedy et al. |
| 5,785,784 | A | 7/1998 | Chesley et al. |
| 5,891,549 | A | 4/1999 | Beretta et al. |
| 5,938,997 | A | 8/1999 | Sakakibara et al. |
| 5,948,337 | A | 9/1999 | Sakakibara et al. |
| 5,952,017 | A | 9/1999 | Nishida et al. |
| 6,203,307 | B1 | 3/2001 | Neider et al. |
| 6,287,665 | B1 | 9/2001 | Hammer |
| 6,540,863 | B2 | 4/2003 | Kenney et al. |
| 6,551,539 | B1 | 4/2003 | Leach et al. |
| 6,692,674 | B1 | 2/2004 | Kurtz, Jr. et al. |
| 7,014,906 | B2 | 3/2006 | Tuman et al. |
| 7,048,818 | B2 | 5/2006 | Krantz et al. |
| 7,048,984 | B2 | 5/2006 | Seth et al. |
| 7,195,729 | B2 | 3/2007 | Jackson et al. |
| 7,235,202 | B2 | 6/2007 | Seth et al. |
| 7,238,314 | B2 | 7/2007 | Jackson et al. |
| 7,303,711 | B2 | 12/2007 | Gallant et al. |
| 7,390,451 | B2 | 6/2008 | Jackson et al. |
| 7,438,847 | B2 | 10/2008 | Clune et al. |
| 7,622,180 | B2 | 11/2009 | Seth et al. |
| 8,297,581 | B2 | 10/2012 | Golle et al. |
| 8,551,377 | B2 | 10/2013 | Dowd |
| 8,668,799 | B2 | 3/2014 | Knox et al. |
| 9,399,333 | B2 | 7/2016 | Medina et al. |
| 9,475,205 | B2 | 10/2016 | Qi et al. |
| 9,944,764 | B2 | 4/2018 | Chandrasekaran et al. |
| 10,531,711 | B2 | 1/2020 | Medina et al. |
| 11,027,463 | B2 | 6/2021 | Kopanski et al. |
| 11,161,283 | B2 | 11/2021 | Kopanski et al. |
| 2004/0088835 | A1 | 5/2004 | Tachauer et al. |
| 2004/0170801 | A1 | 9/2004 | Seth et al. |
| 2004/0170802 | A1 | 9/2004 | Seth et al. |
| 2004/0178544 | A1 | 9/2004 | Jackson et al. |
| 2004/0180186 | A1 | 9/2004 | Jackson et al. |
| 2005/0079321 | A1 | 4/2005 | Tuman et al. |
| 2005/0139971 | A1 | 6/2005 | Minato |
| 2005/0280175 | A1 | 12/2005 | Tachauer et al. |
| 2006/0145387 | A1 | 7/2006 | Seth et al. |
| 2006/0249870 | A1 | 11/2006 | Tachauer et al. |
| 2007/0035060 | A1 | 2/2007 | Harvey et al. |
| 2007/0172628 | A1 | 7/2007 | Seth et al. |
| 2007/0176325 | A1 | 8/2007 | Jackson et al. |
| 2007/0210477 | A1 | 9/2007 | Seth et al. |
| 2008/0009821 | A1 | 1/2008 | Seth et al. |
| 2008/0050553 | A1 | 2/2008 | Tuma |
| 2008/0272512 | A1 | 11/2008 | Clune |
| 2010/0025881 | A1 | 2/2010 | Seth et al. |
| 2010/0038511 | A1 | 2/2010 | Golle et al. |
| 2010/0180407 | A1 | 7/2010 | Rocha |
| 2011/0253289 | A1 | 10/2011 | Shepard |
| 2012/0042483 | A1 | 2/2012 | Cheng |
| 2013/0280474 | A1 | 10/2013 | Medina et al. |
| 2015/0076727 | A2 | 3/2015 | Rocha |
| 2015/0104614 | A1 | 4/2015 | Gallant |
| 2016/0309855 | A1 | 10/2016 | Medina et al. |
| 2019/0126519 | A1 | 5/2019 | Hodsdon |
| 2019/0193310 | A1 | 6/2019 | Kopanski et al. |
| 2020/0198192 | A1 | 6/2020 | Kopanski et al. |
| 2021/0252750 | A1 | 8/2021 | Kopanski et al. |

FOREIGN PATENT DOCUMENTS

| | | |
|---|---|---|
| CN | 1930399 | 3/2007 |
| CN | 101863100 | 10/2010 |
| EP | 1785051 | 5/2007 |
| EP | 2679112 | 1/2014 |
| EP | 2807999 | 12/2014 |
| JP | S61121923 | 6/1986 |
| WO | WO 2011/018821 | 2/2011 |

OTHER PUBLICATIONS

EP Search Report in European Appln. No. 21212210.5, dated Feb. 18, 2022, 8 pages.

PCT International Search Report in International Application No. PCT/EP2018/084495, dated Apr. 3, 2019, 16 pages.

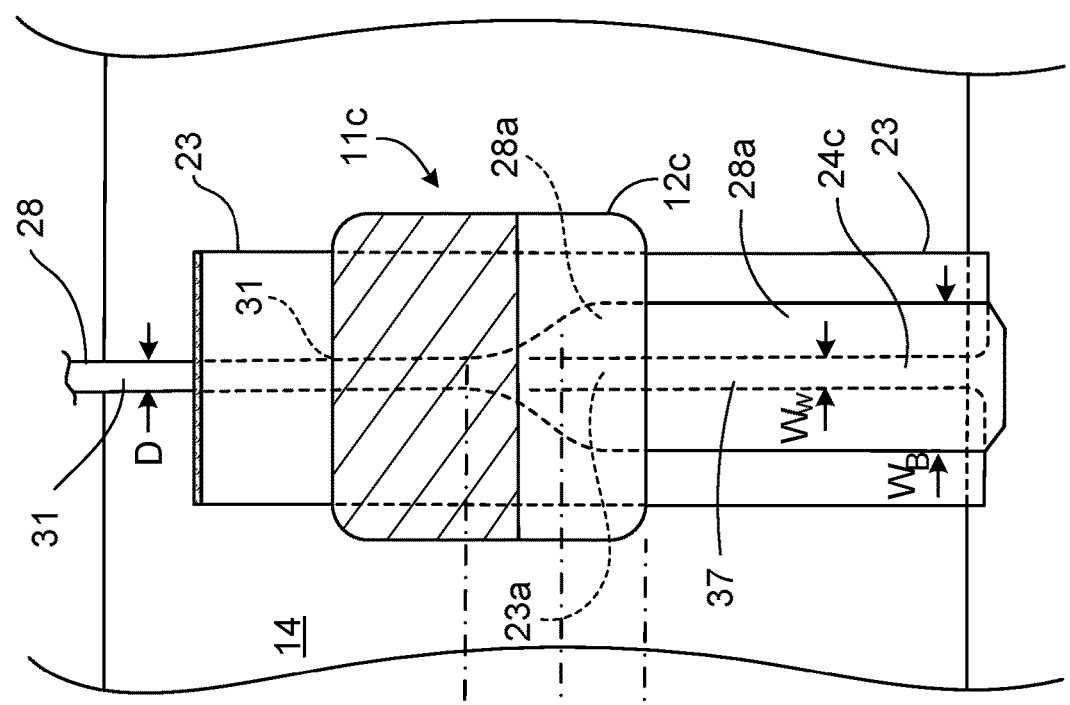
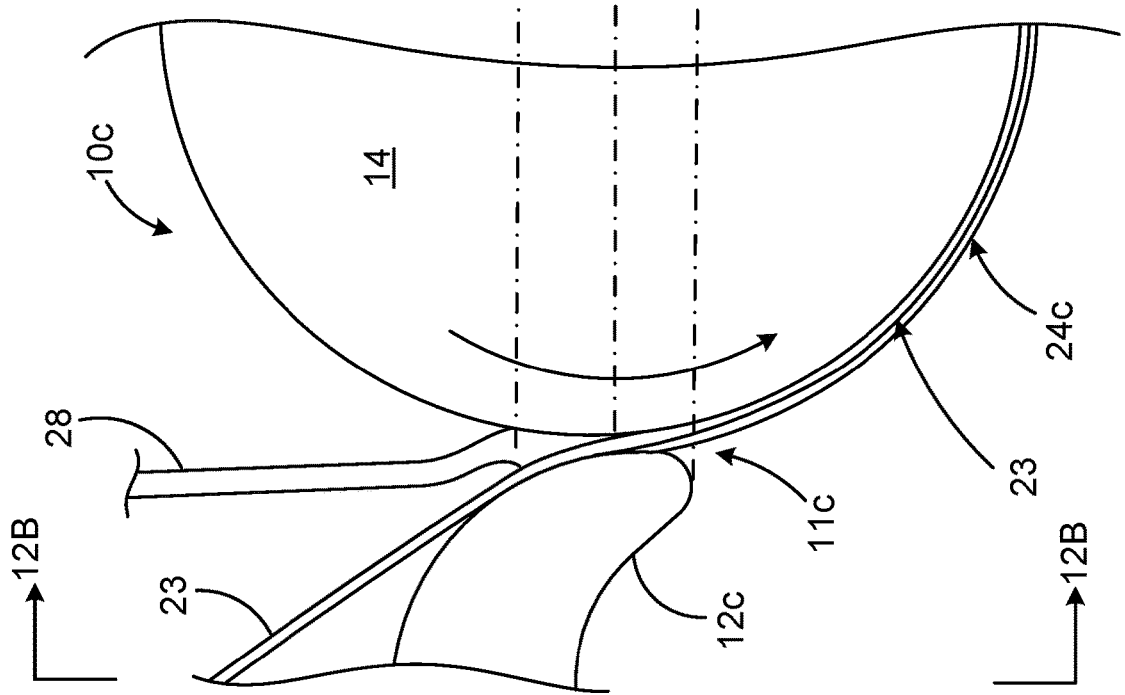

MOLDING RESIN TO FORM CONTINUOUS STRUCTURES

CROSS REFERENCE TO RELATED APPLICATIONS

This application is a continuation of U.S. Ser. No. 17/308,137, filed May 5, 2021, which is a divisional of U.S. Ser. No. 16/225,331, filed Dec. 19, 2018, now issued U.S. Pat. No. 11,027,463, which claim priority to U.S. Provisional Application No. 62/608,622, filed Dec. 21, 2017, and each application is hereby incorporated by reference in its entirety for all purposes.

TECHNICAL FIELD

This invention relates to molding equipment and processes for molding resin, and to products produced thereby, particularly touch fastening products.

BACKGROUND

Roll-forming processes are employed to form resin into various products, including to mold continuous flexible strips of resin with arrays of projections extending from one side of a base layer. In some cases, the strips are formed permanently laminated to a flexible substrate, such as by running the substrate through a molding nip with molten resin and forcing the resin into small cavities of a molding surface. Improvements in the controlled thickness and uniformity of the base layer are sought, as well as improvements in roll-molding methods and in the equipment for performing such methods.

SUMMARY

One aspect of the invention features a molding apparatus including a movable molding surface, a pressure shoe, and a resin source. The molding surface defines an array of molding cavities. The pressure shoe has a generally stationary outer surface that defines, in cooperation with the molding surface, a pressure zone. The resin source is configured to introduce molten resin into the pressure zone to be forced into at least some of the molding cavities by pressure in the pressure zone. The molding surface is movable with respect to the pressure shoe to progressively introduce molding cavities to the pressure zone. The molding cavities are filled with resin while the outer surface of the pressure shoe and the molding surface define therebetween an entrance gap of progressively decreasing width upstream of the pressure zone. The outer surface of the pressure shoe is spaced from the molding surface in the pressure zone to define a minimum gap at which the outer surface of the pressure shoe has a slope essentially and locally parallel to the molding surface. The pressure shoe is adapted to be held in a flexed condition against resin in the pressure zone while forcing resin into the cavities, with the outer surface of the pressure shoe curved upstream of the pressure zone.

In some examples, the molding apparatus further includes a pressure roll that forms a pressure nip with the molding surface downstream of the pressure zone. The pressure roll is configured to further force resin into the molding cavities under pressure in the pressure nip. In some examples, the molding apparatus further includes a substrate feeder arranged to feed a flexible substrate into the pressure nip, such that pressure in the pressure nip laminates the flexible substrate to resin in the pressure nip.

In some embodiments, the outer surface of the pressure shoe is conformable to surface variations of the movable molding surface. In some examples, the outer surface of the pressure shoe is conformable such as to form a resin base with a substantially uniform thickness of less than 0.075 millimeters.

In some arrangements, the movable molding surface includes a mold roll.

In some examples, the molten resin includes a resin viscosity of greater than 700,000 centipoise.

In some cases, the pressure shoe includes a cantilevered compliant blade with one end fixed and a second end flexed under pressure in the pressure zone.

In some examples, the pressure shoe includes a flexible strip with two fixed ends with the outer surface having a side surface of the strip that extends between the fixed ends. In some cases, the fixed ends are configured to hold the strip in a curved state in an absence of pressure in the pressure zone. In some examples, an upstream one of the fixed ends of the strip is held by a clamp that is selectively operable to advance strip material from a strip material supply to present an unworn portion of strip side surface to the pressure zone.

In some embodiments, the molding apparatus further includes a shoe reaction surface disposed on a side of the shoe opposite the molding surface, arranged to press the shoe against the resin in the pressure zone.

In some examples, the pressure shoe includes multiple shoe portions spaced along a width of the molding surface. The shoe portions form respective pressure zones with the molding surface.

In some cases, the cavities each have an entrance area, at the molding surface, of less than about 1.5 square millimeters, and the cavities each define a total molding volume of at least 0.0027 cubic millimeters.

Another aspect of the invention features a method of molding resin, the method including introducing molten resin to a pressure zone defined between a movable molding surface and a generally stationary outer surface of a pressure shoe. The outer surface is held in a flexed condition against the resin in the pressure zone, with the molding surface defining an array of molding cavities that extend from a periphery of the molding surface. The method includes forcing at least some of the introduced resin into the molding cavities under pressure applied at the pressure zone, while the molding surface continues to move with respect to the outer surface of the pressure shoe. The method includes allowing the resin forced into the molding cavities to solidify, and then stripping the solidified resin from the molding cavities as the molding surface continues to move. The outer surface of the pressure shoe and the molding surface define between them an entrance gap of progressively decreasing width upstream of the pressure zone. The outer surface of the pressure shoe is spaced from the molding surface in the pressure zone to define a minimum gap at which the outer surface of the pressure shoe has a slope essentially and locally parallel to the molding surface.

In some examples, the cavities each have an entrance area, at the molding surface, of less than about 1.5 square millimeters, and the cavities each define a total molding volume of at least 0.0027 cubic millimeters.

In some cases, the resin has a viscosity, as introduced to the pressure zone, of greater than 700,000 centipoise.

Another aspect of the invention features a method of molding resin. The method includes introducing molten resin to a pressure zone defined between a movable molding surface and a reaction surface. The molding surface defines an array of molding cavities that extend from a periphery of the molding surface. The method includes passing a substrate through the pressure zone in a machine feed direction to laminate the resin to the substrate, while forcing the resin in the pressure zone into the molding cavities to mold resin projections extending from a resin base laminated to the substrate. The method includes stripping the resin from the molding surface as a longitudinally continuous strip. At least a portion of the substrate is continuously melted in the pressure zone, such that the molten resin and the melted portion of the substrate together form a longitudinally continuous band of resin free of meld lines. The band includes at least some of the projections with an exposed surface opposite the projections.

In some examples, the substrate has a width greater than the melted portion of the substrate, forming a longitudinally continuous resin band bounded by two unmelted portions of the substrate. In some embodiments, the resin band is transparent, forming a longitudinally continuous window.

Another aspect of the invention features a molding apparatus including a movable molding surface that defines an array of molding cavities and surface channels interconnecting the molding cavities. The molding apparatus also includes a reaction surface defining in cooperation with the molding surface a pressure zone, and a resin source configured to introduce molten resin into the pressure zone to be forced into at least some of the molding cavities and some of the surface channels by pressure in the pressure zone. The molding apparatus includes a take-off roll adjacent the molding surface downstream of the wiper, for stripping solidified resin from the cavities and surface channels of the molding surface. The solidified resin is in the form of a continuous product having projections extending from one side of a network of interconnecting resin segments defining apertures through the product.

Another aspect of the invention features a method of making a fastener product. The method includes introducing molten resin to a pressure zone defined between a reaction surface and a movable molding surface. The molding surface defines interconnected channels bounding raised portions of the molding surface and discrete cavities that extend inward from the channels. The method includes forcing at least some of the introduced resin into the channels and cavities under pressure applied at the pressure zone. The method includes allowing the resin forced into the molding cavities and the channels to solidify. The resin in the channels forms a continuous web of interconnected threads from which molded projections extend. The method includes stripping the solidified resin from the molding surface as the molding surface continues to move, and forming apertures bounded by the threads.

In some examples, the apertures are formed on the molding surface. In some cases, forcing some of the resin into the channels and cavities leaves some of the introduced resin covering the raised surface portions. In some examples, forming the apertures includes removing the resin covering the raised surface portions to expose the raised surface portions between the filled channels. In some examples, the resin covering the raised surface portions is removed by wiping or scraping the resin from the raised surface portions by a wiper or scraper disposed downstream of the reaction surface and operating against the molding surface. In some cases, the reaction surface wipes resin from the raised surface portions, leaving the raised surface portions exposed.

In some embodiments, the method further includes, after forming the apertures and before stripping the solidified resin from the molding surface, laminating a substrate to the resin in the filled channels. In some examples, stripping the solidified resin from the molding surface includes stripping the substrate from the molding surface.

In some arrangements, the apertures are formed after the solidified resin is stripped from the molding surface. In some cases, the apertures are formed by melting resin between the threads by applying heat from a side of the web opposite the projections. In some examples, the heat is applied by flame treatment.

In some cases, the cavities are shaped such that the molded projections include discrete loop-engageable fastener elements.

In some examples, the method further includes, after stripping the solidified resin from the molding surface, deforming the molded projections to form discrete fastener elements.

Various aspects of the invention disclosed here enable cost-effective commercialization of molded fastener products with extremely thin resin bases and higher strengths. Using a generally stationary compliant shoe in place of a counter-rotating pressure roll allows a molding apparatus to produce strong fastening products while using low-cost equipment such as silicone strips or shoes instead of a pressure roller.

The generally stationary shoe acts as a fixed reaction surface that forces resin into the cavities of the pressure roll. The shoe remains generally stationary during the molding process, meaning it does not move significantly with respect to the rotating mold roll.

Slight motion of the shoe may include vibration or slight shifts due to high molding pressures.

Molding resin between a stationary surface and a moving surface can have various advantages. As resin enters the pressure nip, the resin moves between the surface of the stationary shoe and the surface of the rotating mold roll. Such conditions cause a velocity gradient to form in the resin, creating a churning effect in the resin referred to herein as the Kopanski effect. The Kopanski effect causes a resin bed formed upstream of the nip to rotate toward the mold roll surface. It is theorized that such effect in the resin helps produce products with an ultra-thin base. Other advantages include laminating resin to a back surface of a substrate when the substrate is melted to create a window of resin. Such products feature superior properties such as high strength, high flexibility, and lightweight.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 12A is a schematic view of a section of the molding apparatus in FIG. 11

FIG. 12B is a front view of the section of the molding apparatus in FIG. 12A, cut at line 12B-12B.

Like reference numbers indicate similar elements.

DETAILED DESCRIPTION

Figure 1:
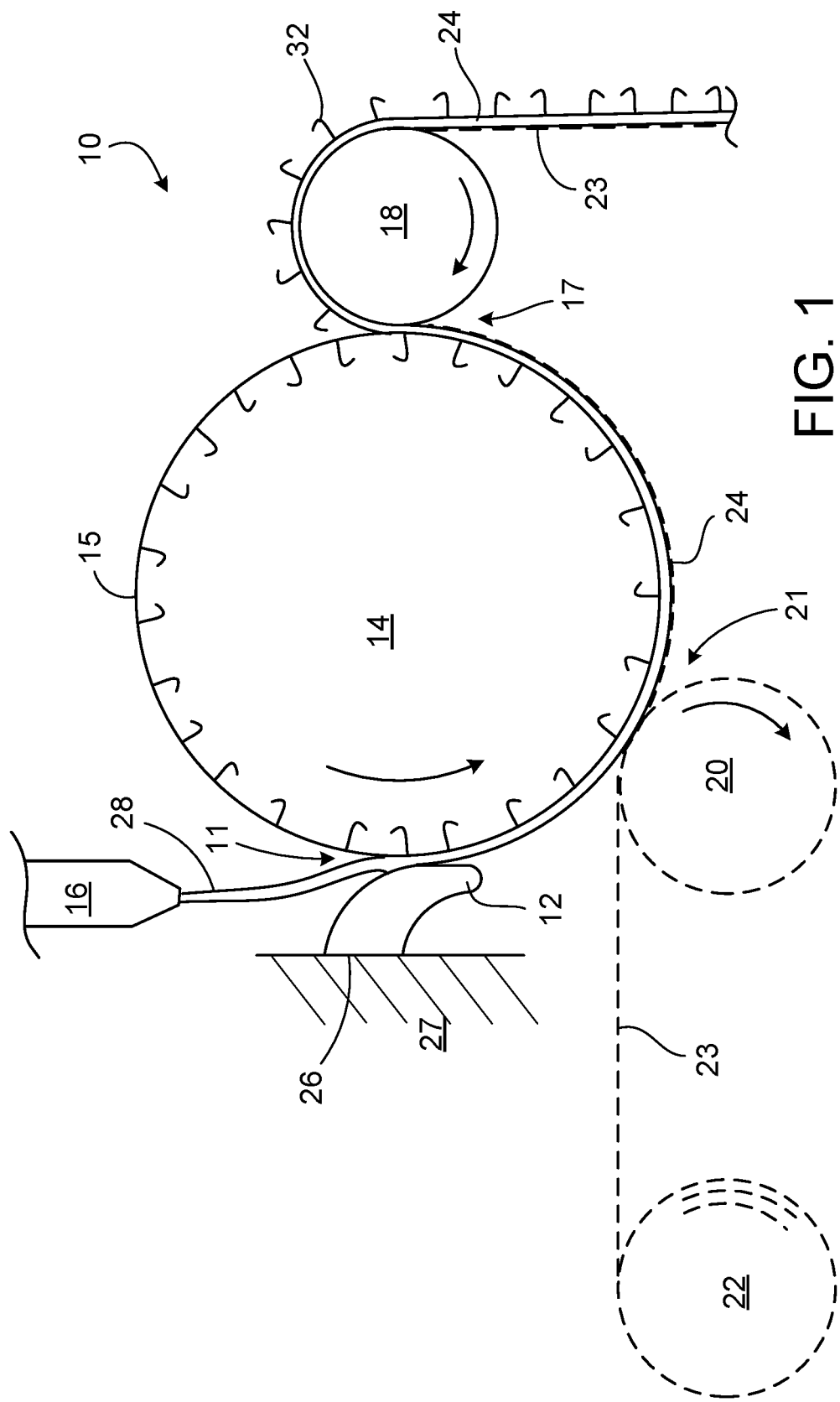
FIG. 1 is a schematic view of a molding apparatus.
Figure 2:
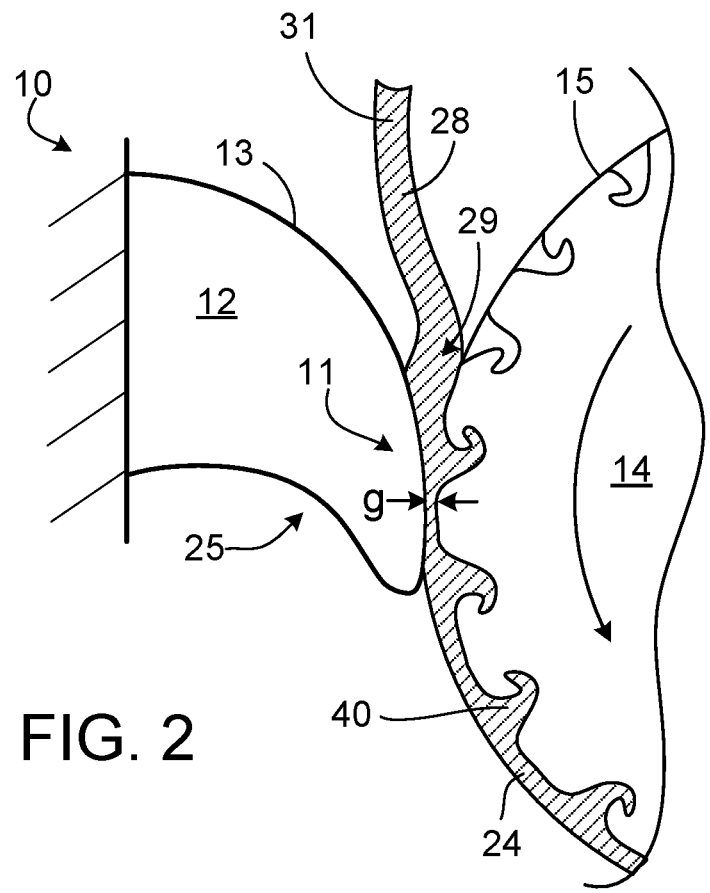
FIG. 2 is a schematic view of a section of the molding apparatus in FIG. 1.

Referring to FIGS. 1 and 2, a method and apparatus 10 for manufacturing fastening products features a rotating mold roll 14 with a cylindrical surface formed from an axial stack of plates or rings that define an array of mold cavities. Mold roll 14 forms a pressure nip 11 (e.g., a pressure zone) in cooperation with a stationary pressure shoe 12, into which nip a molten, viscous resin 28 is introduced. As shown in FIG. 1, molding apparatus 10 uses a continuous extrusion/roll-forming method for forming touch fastener elements 32 on an integral, resin sheet-form base 24. Molding apparatus 10 includes a stationary pressure shoe 12, a mold roll 14, a resin source 16, and a take-off roll 18. Pressure shoe 12 is used in place of a conventional counter-rotating pressure roll to generate nip pressure to push resin into the mold cavities of the mold roll. The mold roll is preferably a chilled roll, such as the mold roll described in U.S. Pat. No. 4,775,310 to Fischer. As shown in FIG. 2, a pressure in nip 11 is created by pressure shoe 12 being flexed against resin 28 at the nip, engaging mold roll 14 through the resin. Mold cavities 40 of mold roll 14 extend inward from its periphery 15. In many cases, the cavities are each shaped to form a loop-engageable fastener element with an overhanging head. In some other cases, the cavities are shaped to form straight stems without overhanging heads, and the resulting stems are later plastically deformed to form heads.

As shown in FIG. 2, pressure shoe 12 is flexed in nip 11 to force resin 28 to enter and fill exposed molding cavities 40 under high pressure (e.g., greater than 100 psi). Mold cavities 40 are shown enlarged for clarity, but each cavity 40 has a molding volume of between 0.0027 and 0.05 cubic millimeters. The miniature size of mold cavities 40 requires shoe 12 to apply high pressure at nip 11 to fill the cavities with the viscous resin 28, particularly at a running speed of at least ten meters per minute. As pressure shoe 12 forces some of the resin 28 into cavities 40, excess resin forms the resin base 24 on the peripheral surface 15 of mold roll 14, interconnecting the filled cavities that form fastener elements 32.

After the resin 28 has been carried on the mold roll a time/distance sufficient to solidify the resin in the mold cavities 40 and mold roll surface, the resin is peeled from the mold roll, and out of the fixed cavities 40, by take-off roll 18 at a second nip 17 (FIG. 1). Mold roll 14 can be continuously cooled, e.g., by controlled flow of coolant through its interior, heat is extracted from the fastening product as the product travels from the first nip 11 to the second nip 17. The heat removal solidifies fastener elements 32 (e.g., hooks), subsequently allowing elements 32 to be peeled from their fixed cavities. In other words, after hardening, the molded fastener elements are of a shape essentially corresponding to the shape of molding cavities 40.

As shown in FIG. 2, as mold roll 14 rotates with respect to shoe 12, mold roll 14 progressively introduces mold cavities 40 to nip 11 to be filled with resin 28 under pressure. Pressure shoe 12 has an outer surface 13 that, as shoe 12 is held in a flexed position, outer surface 13 is curved upstream of nip 11. Outer surface 13 and mold roll 14 define between them an entrance gap upstream of nip 11, of decreasing gap width as the nip is approached. The gap width progressively decreases to form a minimum gap of width 'g' between shoe 12 and mold roll 14, at which outer surface 13 has a slope essentially and locally parallel to a tangent line (not shown) of mold roll 14. The minimum gap width 'g' may be, for example, between 0.025 and 0.075 millimeters.

As shown in FIG. 1, resin source 16 is a nozzle (e.g., round or slot nozzle) configured to introduce molten resin 28 into nip 11. In this example, the minimum gap width 'g' occurs at the same elevation as the axis of the mold roll (i.e., the shoe engages the side of the mold roll), and the resin is dropped into the pressure nip 11 from above. Alternatively, the shoe and mold roll may be vertically stacked (i.e., the shoe engages an underside of the mold roll), in which case nozzle 16 is configured to drape a flow of resin laterally into the nip. Suitable resin 28 materials include linear low-density polyethylene (LLDPE), polypropylene, and nylon. To form fastener elements of suitable strength and resilience, the molten resin 28 may be introduced with a viscosity of between 700,000 and 1,275,000 centipoise, for example.

Figure 2A:
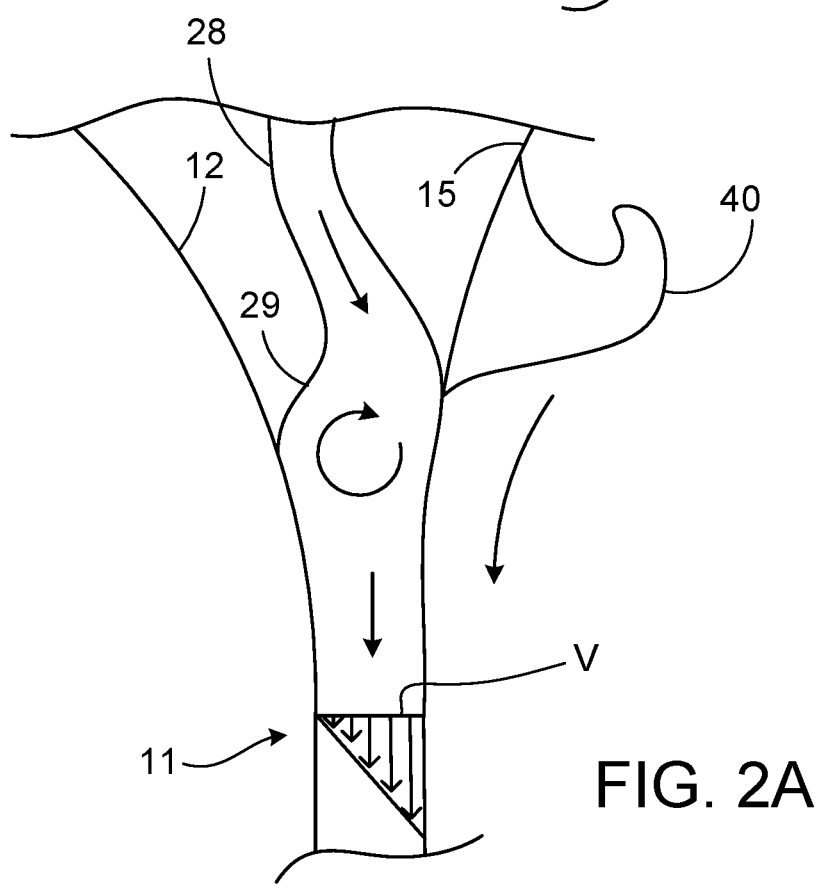
FIG. 2A is an enlarged view of a section of the molding apparatus in FIG. 1, showing a molding nip.

In pressure nip 11, resin 28 is subjected to normal and shear stresses as it moves under pressure between stationary (i.e., shoe) and a moving (i.e., mold roll) surfaces. As shown in FIG. 2, a resin bead 29 (e.g., a slight accumulation of resin) forms upstream of the pressure nip 11, from which bead resin is steadily drawn into pressure nip 11 by operation of the moving mold roll surface. Referring also to FIG. 2A, because resin moves between a stationary and a moving surface, a velocity gradient 'V' and corresponding shear gradient form in resin 28 as the resin passes through nip 11. It is theorized that the velocity gradient 'V' causes a churning of resin within the bead 29, rotating toward the mold roll surface in the upper portion of the bead. Such churning effect is referred to herein as the Kopanski effect. It has been observed that, due to the Kopanski effect, bead 29 has an asymmetric shape, compared to a generally symmetric bead as would be formed between two counter-rotating rolls, and that the stream 31 of resin dropping into the nip curves slightly toward the mold roll. Resin source 16 is preferably positioned slightly toward the shoe side of nip 11 (see FIG. 1). In addition, it is believed that the shear gradient increases the temperature of resin 28 in the nip 11, slightly decreasing the effective viscosity and aiding in cavity filling.

Pressure shoe 12 is made of a flexible material such as 90A silicone. Other materials that can be used include fluorinated elastomers such as Kalrez® (FFKM) or Aflas® (TFE/P), with a preferred durometer range of between 60 and 90 shore A. Such materials are sufficiently heat-resistant and wear-resistant to withstand high resin temperatures and high pressures at the molding nip. Such materials can also stand significant elastic deformation while maintaining a sufficiently firm outer surface to apply pressure against resin 28 at the pressure nip. In this example, pressure shoe 12 is a cantilevered compliant blade, with one end 26 fixed to a stationary base 27, and a second end 25 flexed under pressure in nip 11. Base 27 may be a clamp that secures shoe 12 in one position, or may be adjustable to move shoe 12 toward and away from the mold roll to control the pressure in nip 11.

As shown in dashed lines in FIG. 1, in another example, molding apparatus 10 includes a pressure roll 20 and a substrate feeder 22 feeding a flexible substrate 23 into a third nip 21, in which the substrate is laminated to resin 28. The substrate or sheet-form material 23 may be comprised of one or more of several suitable materials. For example, substrate 23 may be a loop material, a non-woven fabric, a reinforcing scrim, a porous material, paper, or stable foam.

Pressure roll 20 forms third nip 21 with mold roll 14 downstream of first nip 11. Preferably, resin base 24 is still flowable or moldable (e.g., not yet solidified) when entering third nip 21, allowing pressure roll 20 to laminate resin base 24 to a surface of substrate sheet 23. Additionally, pressure roll 20 may be configured to further force resin into the molding cavities of mold roll 14 under pressure in pressure nip 21. Pressure roll 20 can operate in an absence of substrate feeder 22, configured to further force the resin into the molding cavities without laminating a substrate sheet 23.

Figure 3:
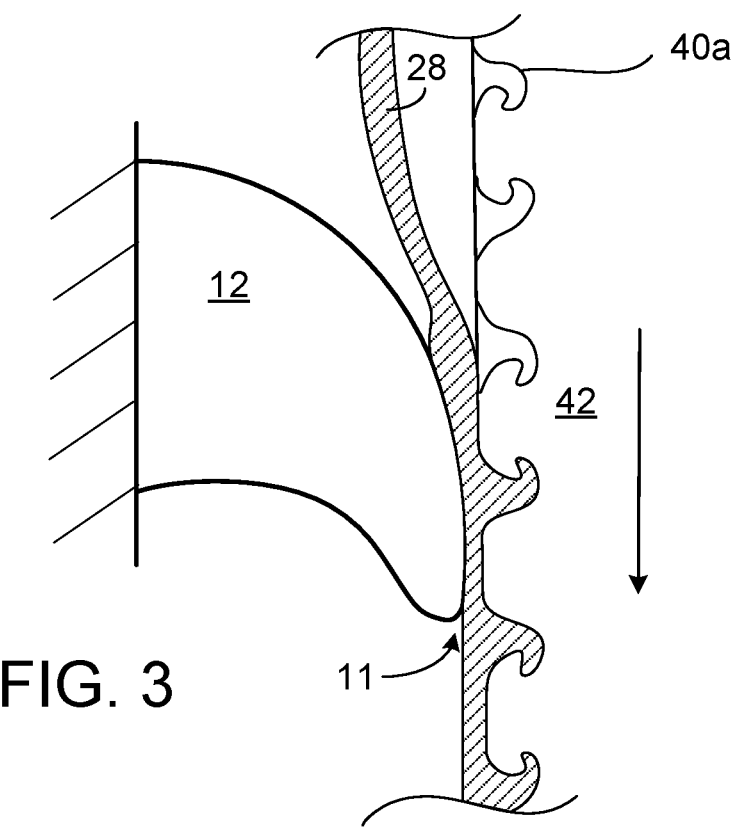
FIG. 3 is a schematic view of a section of a molding apparatus with a flat molding surface.

Now referring to FIG. 3, the molding apparatus may include, instead of a mold roll, a movable molding surface 42 such as a flat plate that moves downward with respect to pressure shoe 12. Molding surface 42 forms a pressure nip 11 with pressure shoe 12. Like the mold roll in FIG. 2, molding surface 42 defines an array of molding cavities 40a extending from a periphery of molding surface 42. Molding surface 42 progressively introduces molding cavities 40 to nip 11 to be filled with resin 28. The flat plate may be a portion of a recirculating belt, for example.

Figure 4:
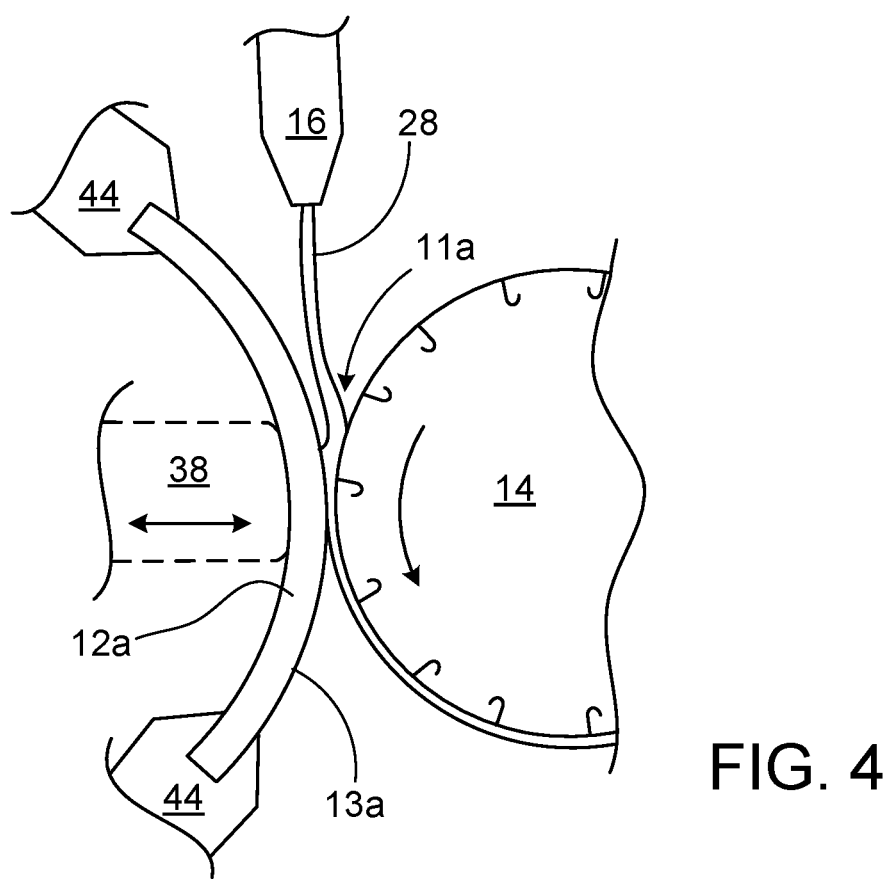
FIG. 4 is a schematic view of a section of a molding apparatus with a pressure shoe secured at two ends.

Referring to FIG. 4, a different configuration of a pressure shoe 12a is illustrated. Pressure shoe 12a is a flexible strip with two ends fixed by clamps 44. Strip 12a may be a thick, silicone strip or a similar material. Shoe 12a has a side surface 13a facing mold roll 14, with a portion of the side surface 13a forming a pressure nip 11a in cooperation with mold roll 14. Clamps 44 hold strip 12a in a curved state (e.g., a flexed, bent state) in an absence of pressure in nip 11a. Similar to the pressure shoe in FIG. 1, outer surface 13a, when pressed against nip 11a, forms an entrance gap with mold roll 14. The entrance gap progressively decreases in width upstream of nip 11a to form a minimum gap between shoe 12a and mold roll 14, at which outer surface 13a has a slope essentially and locally parallel to a tangent line (not shown) of mold roll 14. Optionally, a shoe reaction surface 38 (e.g., a ram), shown in dashed lines, is positioned on a side of strip 12a opposite mold roll 14. Ram 38 is operable to move strip toward and away from resin 28 in nip 11a, controlling the pressure in the pressure nip 11a. Clamps 44 may also adjust the pressure in nip 11a by further bending strip 12a against resin 28 in pressure nip 11a.

Figure 5:
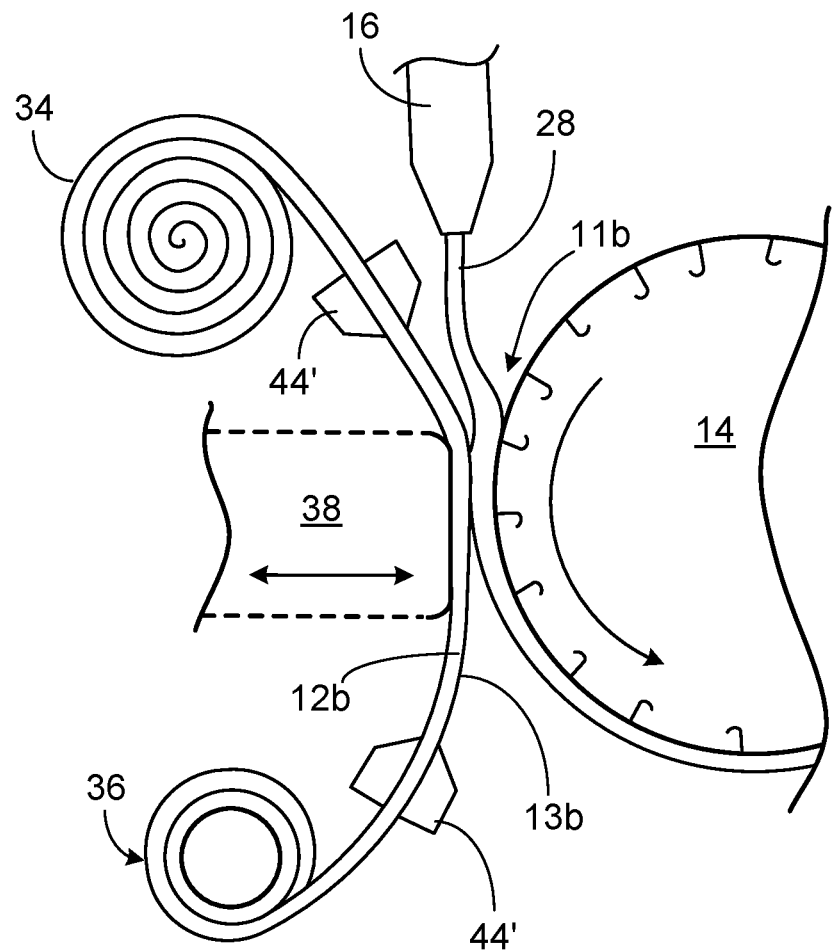
FIG. 5 is a schematic view of a section of a molding apparatus with a pressure shoe secured and spooled at two ends.

Referring to FIG. 5, a similar example of a pressure shoe is shown. In this example, the molding apparatus uses a strip that can be advanced when the surface of strip exposed to nip 11b becomes worn. Pressure shoe 12b is a long, flexible strip with two ends respectively wound to spool rollers 34 and 36. Spool roller 34 functions as a strip material supply, and roller 36 functions as a worn strip material take-up spool. Flexible strip 12b has a side surface 13b facing mold roll 14, with a portion of the side surface exposed to pressure nip 11b. The portion of side surface 13b exposed to nip 11b wears out due to the heat and friction in nip 11b caused by the high temperature of the resin and high molding pressures. A pair of fixed clamps 44' hold strip 12b at each end, with each clamp 44' positioned between pressure nip 11b and a respective spooled end of strip 12b. At least one of clamps 44' is selectively operable to advance strip 12b such that spool roller 34 supplies strip material to present an unworn portion of strip side surface 13b to nip 11b. while roller 36 takes up worn strip material. Similar to the molding apparatus in FIG. 4 and shown in dashed lines, a ram 38 can alternatively be positioned on a side of strip 12b opposite mold roll 14, to control the pressure at nip 11b.

Figure 6A:
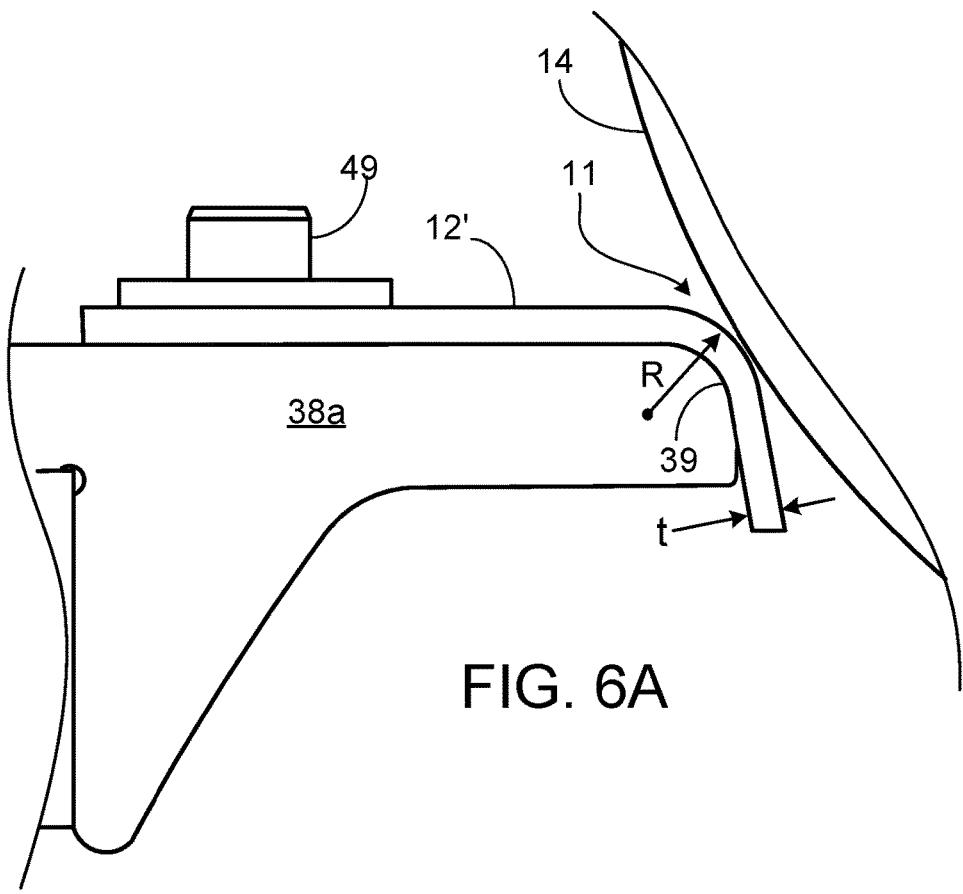
FIG. 6A is a schematic view of a pressure shoe mounted on a shoe holder.

Referring to FIG. 6A, a pressure shoe 12' is illustrated in form of a flexible strip. Pressure shoe 12' is mounted on a shoe holder 38a (e.g., a ram) that has a curved corner 39 for the shoe 12' to curve at the pressure nip 11. Shoe 12' is fixed on one side to ram 38a by a mechanical fastener 49 and extends along a surface of the ram past the curved corner 39 of the ram. In some embodiments, the corner 39 has a corner radius that, as the shoe extends along the corner, the shoe surface exposed to the nip forms a corner radius 'R' of approximately 12.7 millimeters, with the shoe 12' having a thickness 't' of approximately 3.2 millimeters.

Figure 6B:
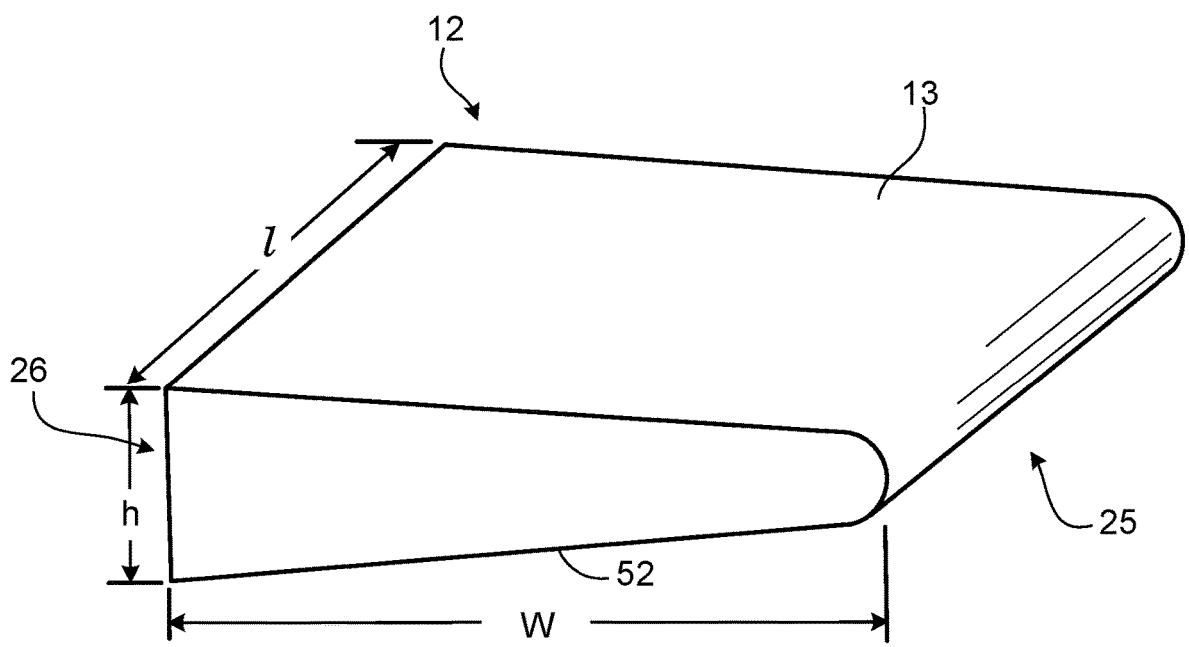
FIG. 6B is a perspective view of a pressure shoe.

FIG. 6B illustrates the pressure shoe 12 shown in FIGS. 1-3. Pressure shoe 12 has a cantilevered compliant 'blade' shape. Shoe 12 has a wide end 26 configured to be fixed (e.g., clamped or fastened to a ram) and an overhanging, narrow end 25 that flexes under pressure. Narrow end 25 is narrow enough to permit pressure shoe 12 to flex, as shown in FIG. 1. Shoe 12 has two wide surfaces 13 and 52, including a working surface 13 that contacts the resin at the pressure nip. Pressure shoe 12 has a length 'l' that may be selected according to a desired width of the product, as discussed below with respect to FIG. 7. The dimensions of pressure shoe, 'l', 'w', and 'h' may be, for example, 10.2, 15.2, and 0.32 centimeters, respectively. When shoe 12 is flexed in the molding apparatus, working surface 13 is placed in tension, contacting the resin at the pressure nip, while lower surface 52 is placed in compression under bending stress. Shoe 12 is sufficiently conformable to accommodate slight variations in diameter of the mold roll along its length. This can, for example, help to form a fastener product having a particularly uniform resin base (e.g., substantially flat with a more uniform thickness).

Thus, one potential advantage of using a stationary, compliant shoe instead of a counter-rotating roll is that the fastening product can be produced with a very thin base layer. Such fastening products can be held to very close dimensional tolerances. The increased uniformity of the resin base thickness may allow shoe 12 to form an 'ultra-thin' resin base with a thickness of less than 0.025 millimeter. A fastening product with an ultra-thin base can be used to lower resin usage while maintaining the same functional attributes from the integrally molded features. This is advantageous for cost-sensitive markets such as personal care as well as applications in transportation markets where weight savings is desirable. It similarly can provide an improved hand, perceived as more cloth-like and less plastic-like. Additionally, a thinner resin base translates into improved flexibility, improving the peel-performance of the product, meaning that the lanes of fastener elements can be peeled off one-by-one, as opposed to stiffer products in which several lanes are peeled off all at once.

Figure 7:
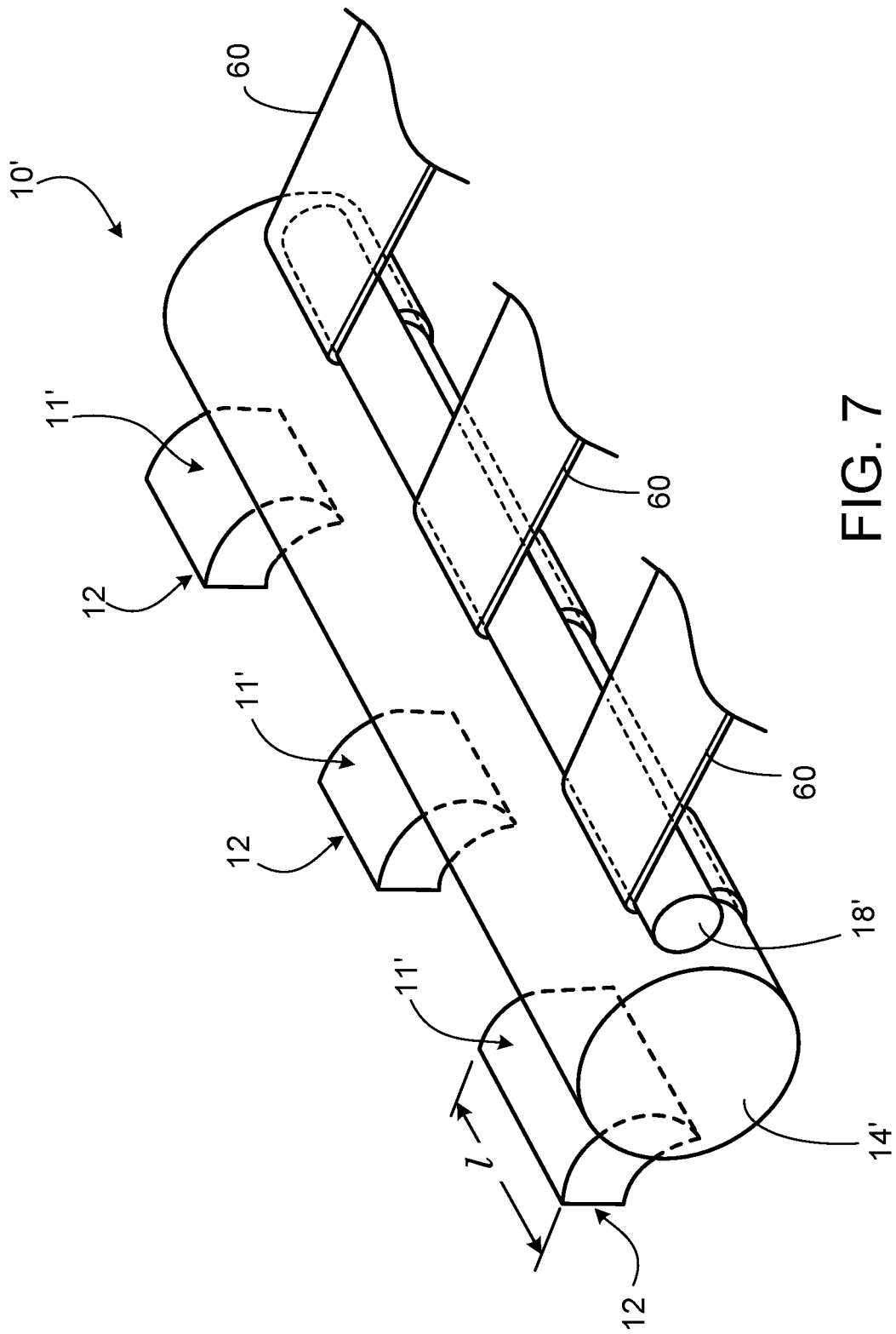
FIG. 7 is a perspective view of a molding apparatus with three pressure shoes.

Referring now to FIG. 7, a molding apparatus 10' is arranged with multiple pressure shoes 12 spaced apart in a lateral direction, forming multiple pressure nips 11'. Each pressure nip 11' is formed between a respective pressure shoe 12 and a common surface of a mold roll 14'. Each pressure shoe 12 may vary in length to mold resin strips 60 of different widths. They may also vary in hardness, stiffness and other properties. Alternatively, instead of multiple separate pressure shoes, molding apparatus 10' may include one pressure shoe with multiple shoe portions that contact mold roll 14', defining respective pressure nips 11' with the mold roll. Similar to the molding apparatus shown in FIG. 1, a take-off roll 18' peels the solidified resin strips 60 from the fixed mold cavities of mold roll 14'. In some examples, a substrate feeder (not shown) such as the one illustrated in FIG. 1 introduces a substrate to be laminated to some or all of the resin strips 60.

Figure 8A:
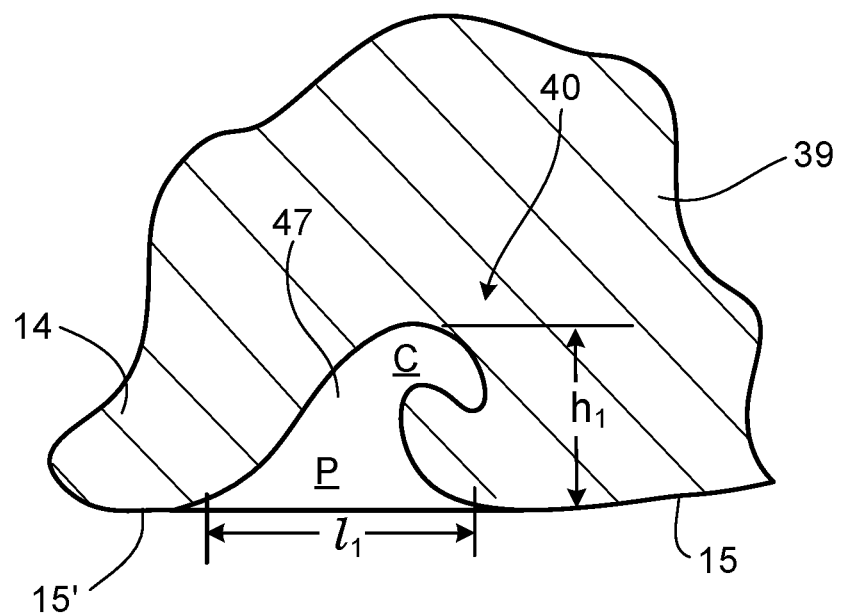
FIG. 8A is an enlarged, partial cross-section view through the mold roll in FIG. 1, showing a mold cavity.
Figure 8B:
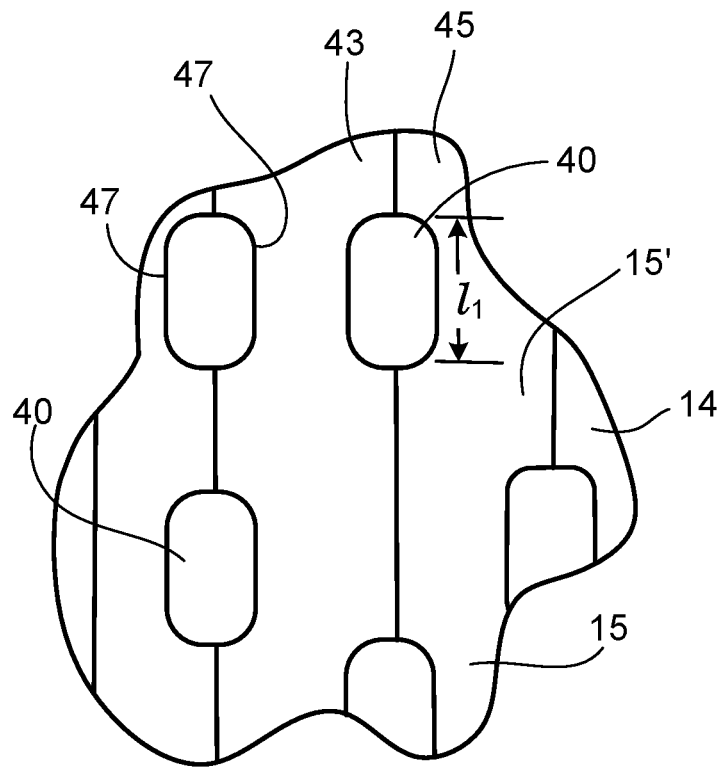
FIG. 8B is an enlarged, partial front view of a surface of the mold roll in FIG. 1, showing mold cavities.

Referring to FIGS. 8A and 8B, fixed mold cavities 40 are shown extending from a periphery 15 of mold roll 14. As shown in FIG. 8A, the profile of a J-shaped mold cavity 40 defines a pedestal portion or chamber 'P' and a crook portion 'C'. Mold cavity 40 has a total height '$h_1$' of between 0.25 and 2.0 millimeters. Mold cavity has a base length '$l_1$' of only about 0.5 to 1.25 millimeters. The shape of the pedestal portion 'P' and the crook portion 'C' is specifically designed to facilitate easy removal of the solidified fastener elements by the take-off roll. The cavities are 'fixed' in that they do not open to release the molded hooks; rather, the molded resin is elastically distended to pull the resin back out through the opening of the cavity.

Referring also to FIG. 8B, each mold cavity 40 is defined between two concentric engraved rings 43 and 45 held tightly together. Rings 43 and 45 have cylindrical outer surfaces 15' that together form the peripheral surface 15 of mold roll 14. Mold roll 14 is formed of multiple rings stacked and disposed about a mandrel (not shown), which keeps the rings tightly pressed against one another to avoid mold flash. Each ring 43 has a small recess 47 in form of a hook and, in cooperation with a mating recess 47, forms a mold cavity 40. In some examples, mold cavities 40 are defined within a single ring 43, either as a depression in one side of the ring or as an opening extending through the full width of the ring, with the cavities partially bounded by flat side surfaces of adjacent rings. Mold cavities 40 each have an entrance area, at the molding surface, of less than about 1.5 square millimeters, and the cavities each define a total molding volume of at least 0.0027 cubic millimeters.

While the molding cavities and fastener elements of the embodiments above have been described and illustrated as being J-hook-shaped, the molding cavities and fastener elements can be of various other shapes. The molding cavities can, for example, be shaped to mold palm tree-shaped fastener elements, mushroom-shaped fastener elements, and/or stems. Some cavity shapes may be defined in a continuous sleeve about a mold roll mandrel rather than in stacked plates.

Figure 9:
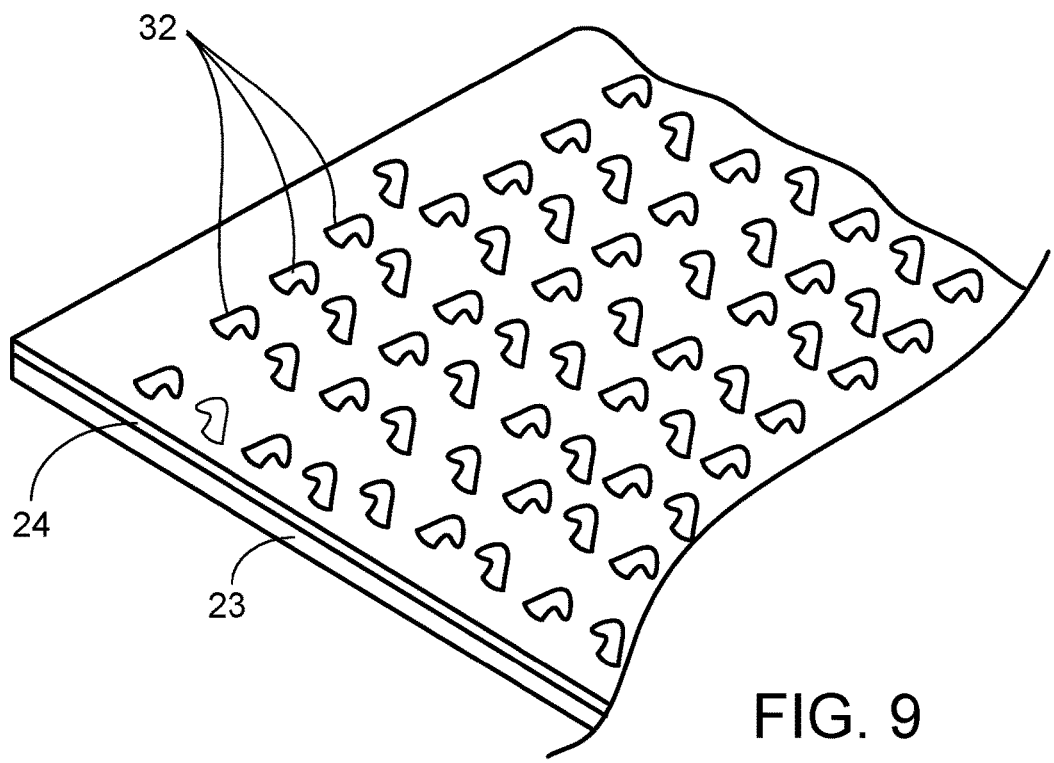
FIG. 9 is a perspective view of a portion of a fastening product with fastener elements.
Figure 10:
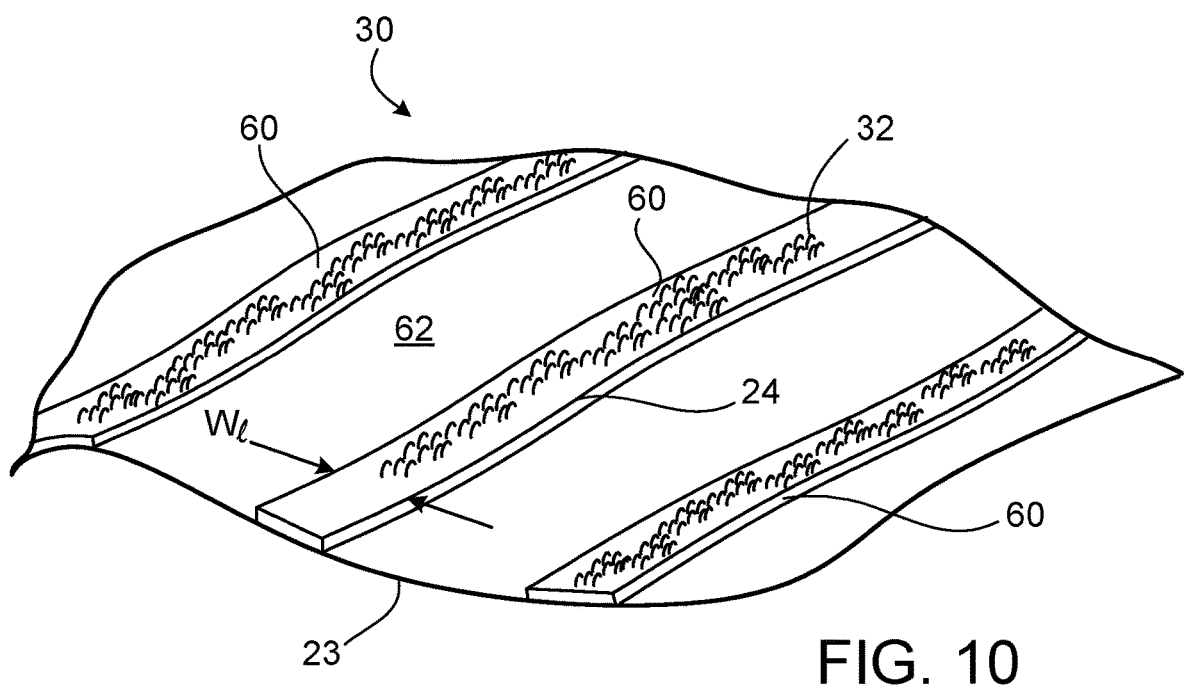
FIG. 10 is a perspective view of a portion of a fastening product having spaced lanes of fastener elements bounding exposed regions of a substrate.

Referring now to FIGS. 9 and 10, two different fastening products are shown. Both fastening products include a flexible sheet substrate 23, a resin base 24, and fastener elements 32 interconnected by the resin base. The touch fastener elements 32 have discrete, spaced-apart resin stems extending from base 24, and may be disposed at a density of, for example, 155 to 775 fastener elements per square cm. The fastener elements have heads that overhang the sides of their stems for releasable engagement of fibers. The fastening product in FIG. 9 may be manufactured, for example, by the molding apparatus in FIG. 1. As illustrated in FIG. 9, flexible sheet substrate 23 is laminated to thin resin base 24 from which touch fastener elements 32 extend. Resin base 24 is thin and flexible enough to not significantly impair the flexibility of the sheet. Substrate 23 may be a fabric, for example, a woven or knit material. In other examples, the substrate is a non-woven product, or a paper or film.

In the embodiment illustrated in FIG. 10, a flexible sheet substrate 23 carries spaced-apart, parallel, longitudinal lanes or strips 60 of touch fastener elements. Fastening product 30 may be manufactured, for example, in the molding apparatus shown in FIG. 7, by introducing a substrate sheet to be laminated to the back of the resin strips 60. The resin strips or lanes 60 each have a thin resin base 24 laminated to a side surface 62 of substrate 23. Each lane 60 has a width '$w_L$' controllable by the amount of resin disposed in the pressure nip and dependent, among other conditions, on the pressure applied at the pressure nip and the length of the pressure shoe. The width '$w_L$' may be, for example, from 3 to 27 millimeters and may be separated from adjacent lanes by exposed widths of the substrate surface, which widths depend on the distance separating the pressure shoes (see FIG. 7). Resin bases 24 may have a thickness of 0.075 millimeters or less, as measured from the substrate surface, and in some cases are of negligible thickness. The touch fastener elements 32 may be disposed in arrays with rows and columns of fastener elements. While illustrated for simplicity with fastener elements in only some regions of the lanes, it will be understood that each lane 60 is essentially covered with its array of fastener elements 32. In some cases, each lane consists of a longitudinal series of discrete islands of fastener elements (e.g., created by interrupted introduction of resin at the pressure nip), each surrounded by exposed substrate. Such striated fastening product 30 can be cut into discrete fastener products, such as fastening tabs for diapers and other disposable personal care products, or to produce bandages or fastening straps, for example.

Figure 11:
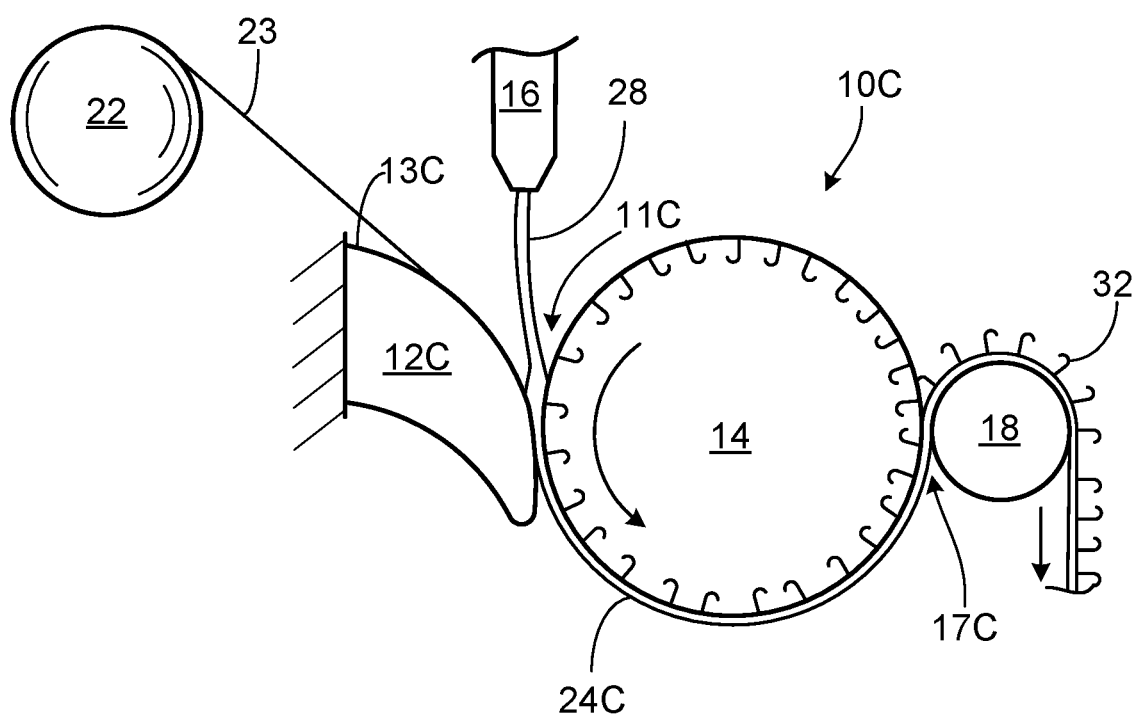
FIG. 11 is a schematic view of a molding apparatus with a substrate feeder upstream of a pressure nip.

Referring to FIG. 11, a molding apparatus 10c similar to the molding apparatus in FIG. 1 is illustrated. Molding apparatus 10c uses a similar 'extrusion/roll-forming' method as the molding apparatus in FIG. 1. Molding apparatus 10c has a substrate feeder 22 that introduces a flexible sheet substrate 23 into a pressure nip 11c. Substrate 23 moves along outer surface 13c of pressure shoe 12c to enter pressure nip 11c from upstream of pressure nip 11c. Like in the molding apparatus in FIG. 1, the pressure nip is formed between stationary pressure shoe 12c and mold roll 14. The pressure in nip 11c is created by pressure shoe 12c being flexed at the nip, engaging mold roll 14 through the substrate 23 and resin 28. Pressure shoe 12c is flexed in nip 11c to force resin 28 to enter and fill exposed molding cavities under significant pressure. As shoe 12c forces resin 28 into the cavities of mold roll 14, excess resin forms a base 24c, interconnecting the filled cavities that form fastener elements 32.

As discussed herein, another advantage of using a stationary compliant shoe instead of a counter-rotating roll is that the substrate can be melted to strengthen the product and form a transparent 'window' with fastener elements. For example, substrate feeder 22 may supply a material that can be melted (e.g., a non-woven substrate) such as a spunbond sheet 23. With a spunbond sheet, molding apparatus 10c can form a fastening product that has a longitudinal window of resin, by continuously melting a portion of the sheet when laminating the resin to the sheet. Referring also to FIGS. 12A and 12B, a front view and a side view are illustrated showing the lamination and melting process of substrate 23. It is theorized that the difference in temperature between the surface of the chilled mold roll 14 (e.g., around 4 to 21 degrees Celsius) and the surface of pressure shoe 12c (e.g., about the temperature of the molten resin) causes a section of the substrate to melt at the nip 11c. More specifically, unlike in a setup with two counter-rotating chilled rolls, the resin 28 is not chilled uniformly (i.e., the resin facing the mold roll chills first and stops recirculating), leaving hot resin exposed to substrate 23 for a sufficient time to melt a portion 23a of the substrate and contact the pressure shoe 12c. The melted portion 23a of the substrate mixes with the resin forming resin base 24c that links the two unmelted sides of the substrate. The flowable resin 28 facing shoe 12c continues to recirculate creating a sharing effect in the resin (as discussed above with respect to FIG. 2A) which decreases the viscosity of the resin, allowing the resin to migrate laterally between the shoe 12c and the substrate 23. The resin 28 is able to further migrate laterally under pressure due to the compliant surface of shoe 12c, forming wings 28a of tapering thickness extending from the resin base 24c. The resin wings 28a that extend from each side of base 24c are each laminated to the back of a respective unmelted section of the substrate. This process forms a longitudinally continuous window with fastener elements on one side and a generally uniform resin surface on the opposite side. After the resin 28 has been carried on the mold roll a time/distance sufficient to solidify the resin in the mold cavities and mold roll surface, the resin is peeled from the mold roll, and out of the fixed cavities, by take-off roll 18 at a second nip 17c. Alternatively, a compliant counter-rotating pressure roller can be used instead of pressure shoe 12c to produce a similar product with a transparent window.

As shown in FIG. 12B, a width of the melted portion 23a (and by extension the width of the window 37) can be approximately the same as a diameter of the resin stream or column 28 before entering the pressure nip. It is theorized that the resin 28 melts the substrate soon after initial contact (e.g., before the resin spreads considerably on the substrate), which causes the resin to melt the substrate only along a width generally equivalent to the diameter of the resin column 28. Thus, by controlling various parameters of the molding apparatus 10c (e.g., running speed of the mold roll and the resin flow rate), the rest of the resin is laminated to a back of the substrate, creating window 37 with a width '$W_w$' generally equivalent to the diameter 'D' of the resin stream 31. The window width '$W_w$' and resin diameter 'D' may be, for example, 6.5 millimeters each, with the mold roll 14 running at a speed of at least ten meters per minute. The base 24c and wings 28a together may be formed with a width '$W_B$' of around 25.5 millimeters.

Figure 13A:
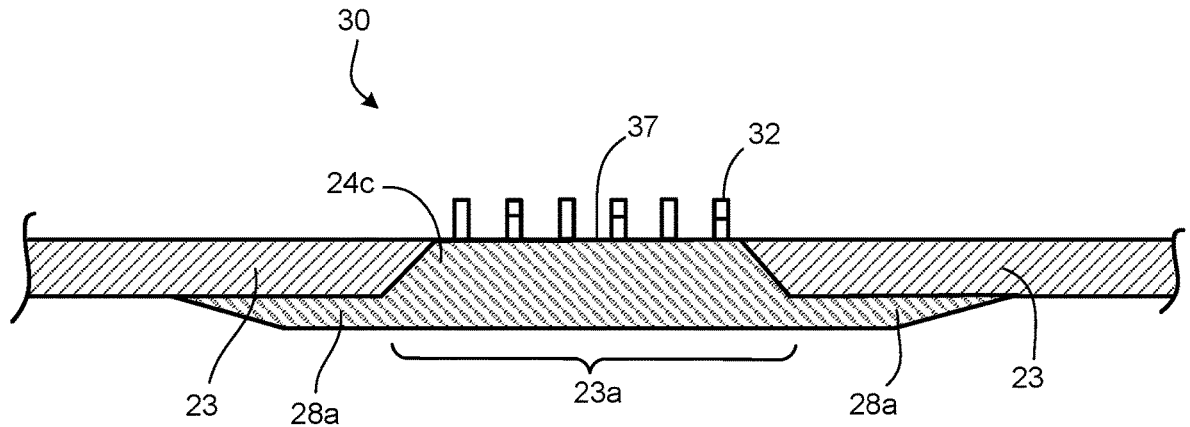
FIG. 13A is a detailed, cross-section view of a fastening product having a window of resin base.
Figure 13B:
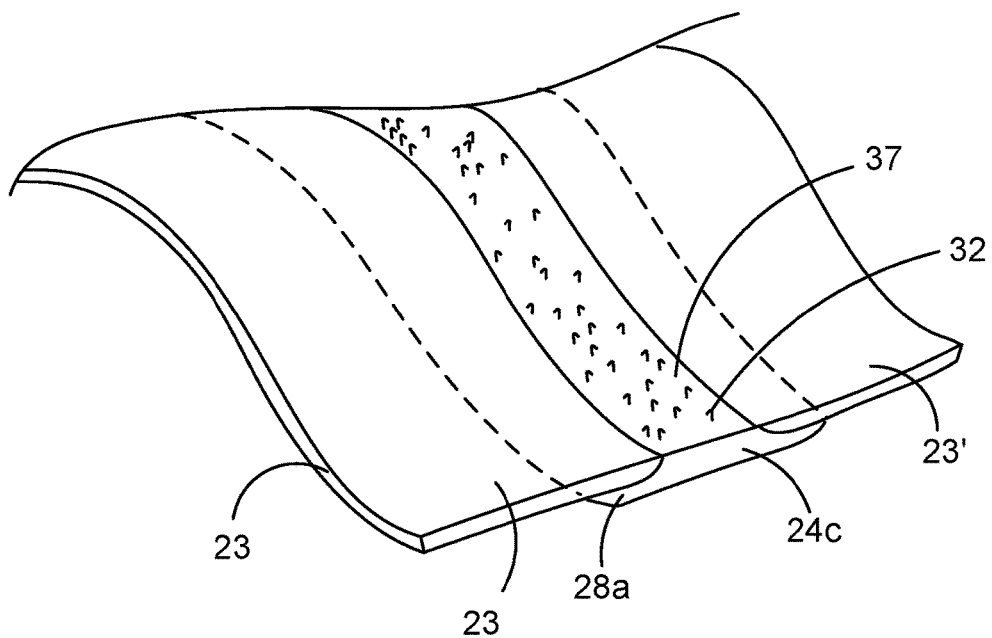
FIG. 13B is a perspective view of the fastening product in FIG. 13A.

FIGS. 13A and 13B show the fastening product 30 formed in molding apparatus 10c. The product 30 has a longitudinally continuous window 37 of resin with a resin base 24c that extends beyond a bottom surface of the substrate 23 and from which wings 28a extend. The resin base and wings are a contiguous formation free of melt lines. Resin base 24c is generally coplanar with the top surface of the substrate 23. As shown in FIG. 13B, window 37 is bounded by exposed regions 23' of the substrate. Fastening product 30 can be used, for example, in applications where resin 28 is transparent (e.g., having a high transmittance of visible light), allowing a user to see an image beneath the fastening product 30 through window 37 when the product is engaged. Such applications may range from functional medical devices that require a transparent fastener material, to personal care products in which aesthetics can be enhanced by allowing the view of a printed pattern. Another advantage of melting the substrate to form a window of resin is that the transition from resin base 24c to substrate 23 is smoother compared to a laminated product with a resin base extending from the substrate. For example, as shown in FIG. 13A, the top surface of resin base 24c and the top surface of substrate 23 are generally coplanar, such that the hooks 32 appear to be extending directly from the substrate 23. This feature may allow the product to feel smoother to the touch and may improve the aesthetic appearance of the product. In some examples, fastening product 30 can be formed with longitudinal islands of fastener elements (e.g., created by interrupted introduction of resin at the pressure nip), with each island having a window 37 surrounded by exposed substrate.

In addition, instead of a window bounded by exposed regions of substrate, molding apparatus 10c may produce a fastening product melting the entire substrate as it passes through the nip. Melting and mixing the entire substrate 23 with resin 28 at the nip may produce a stronger product and improve the molding process by requiring less resin. For example, instead of laminating a substrate to the resin (e.g., producing two distinct layers), melting and mixing a substrate with resin reinforces the product by increasing a tensile strength of the solidified product. This allows the molding apparatus to mold fastening products with less resin while producing a stronger product. The higher strength may translate to a thinner and lighter fastening product.

Figure 14:
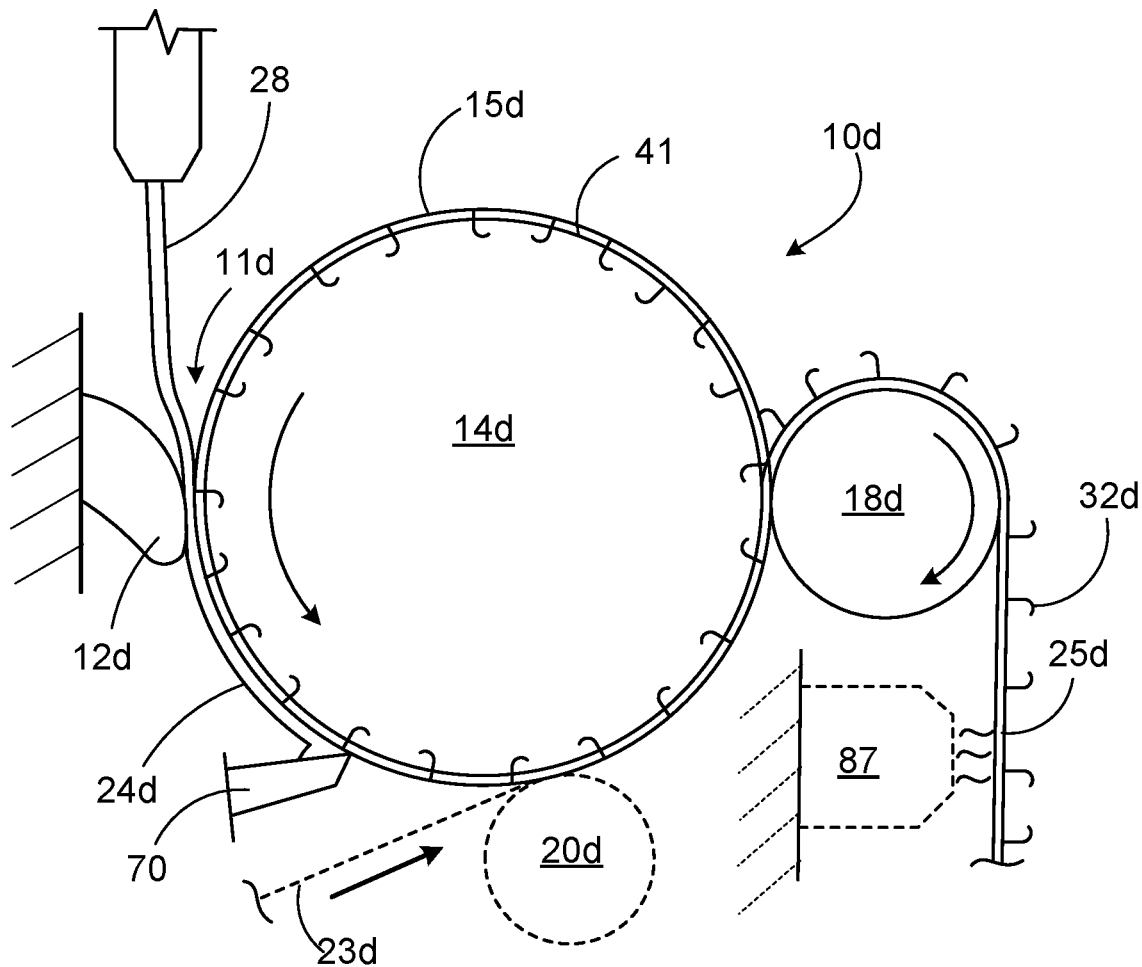
FIG. 14 is a schematic view of a molding apparatus according to a different embodiment.

Referring to FIG. 14, a different configuration of a molding apparatus 10d is illustrated. Molding apparatus 10d is similar to the molding apparatus in FIG. 1, with the main differences being (a) the presence of a wiper or scraper 70 downstream of the pressure nip 11d and (b) the structure of the mold roll 14d. Like the apparatus in FIG. 1, pressure nip 11d is formed between stationary pressure shoe 12d and mold roll 14d. The pressure in nip 11d is created by pressure shoe 12d being flexed at the nip, engaging mold roll 14d through the resin 28. Alternatively, a counter-rotating pressure roller can be used instead of pressure shoe 12c. Referring also to FIG. 15A, the mold roll surface includes raised surface portions 13d bounded by channels or grooves 41. The raised portions 13d together make the molding surface 15d of mold roll 14d. The surface channels 41 are interconnected, and extend from one mold cavity to another. Surface channels 41 have a width '$w_C$' similar to the size of the opening of the mold cavities and ranges, for example, from 0.1 to 0.8 millimeters. Pressure shoe 12d is flexed in nip 11d to force resin 28 to enter and fill exposed molding cavities 40d and surface channels 41 under pressure. As shoe 12d forces resin 28 into the cavities and channels of mold roll 14d, excess resin forms a base 24d interconnecting the filled cavities and surface channels that form the fastener product. Wiper 70 then removes (i.e., wipes or scrapes off) resin base 24d from the raised portions 13d, preferably before it has solidified, exposing the raised portions to leave resin only in the mold cavities 40d and channels 41. After the excess resin is wiped from mold roll 14d, take-off roll 18d peels the solidified resin product from the mold cavities and surface channels in the form of a continuous web. Alternatively, instead of using wiper 70 to remove the resin base 24d, pressure shoe 12d can apply sufficient pressure at the nip 11d to remove the resin from the raised surface portions 13d (e.g., acting as both, a reaction surface and a wiper). In some examples, molding apparatus 10d can be configured without wiper 70 and instead, mold a product with a resin base (e.g., with the shoe leaving resin on the surface of the mold roll) to be later burned to form the continuous web, as discussed in detail with respect to FIG. 16A.

Figure 16:
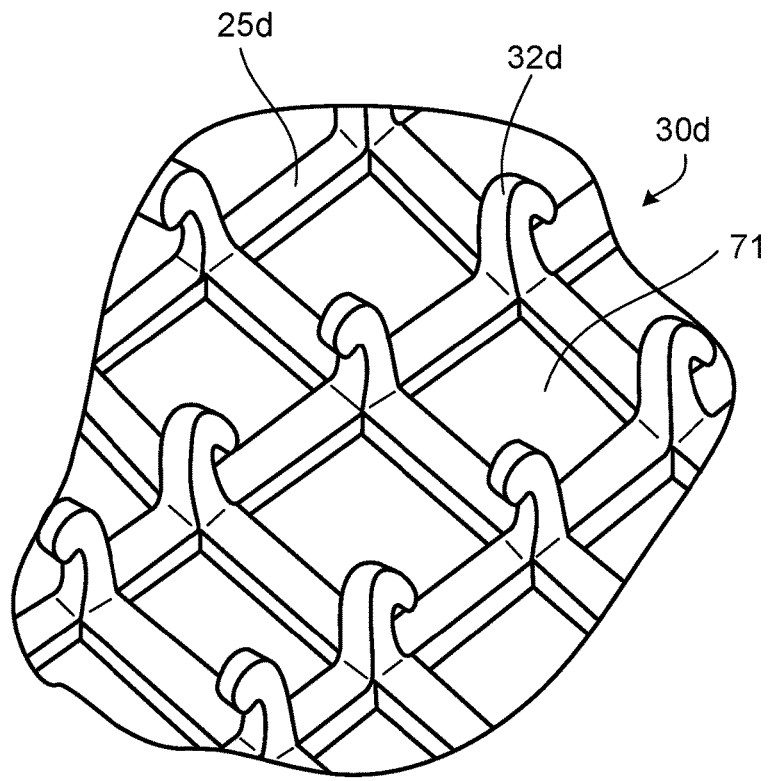
FIG. 16 is a perspective view of a portion of a fastening product formed in the molding apparatus in FIG. 14.

FIG. 16 shows the continuous web 30d of interconnected threads 25d produced by molding apparatus 10d. The product 30d includes resin threads 25d formed in surface channels 41 of the mold roll, and fastener elements 32d formed in mold cavities 40d of the mold roll. Threads 25d form a network that interconnects fastener elements 32d, forming an integral, flexible meshing product. Threads 25d bound apertures 71 which are formed on the mold roll or after striping the web from the mold roll, as discussed above with respect to FIG. 14. The threads 25d that make up the framework of the product are in substantially an as-molded, unstretched state without significant residual stresses. Because the fastener elements extend from threads rather than a solid resin base, the netting product 30d has less material which may reduce the weight of the product. Fastening product 30d can be used in filtering systems and other applications where allowing fluid or solids to pass through openings 71 can be advantageous. Some examples include geotextiles, breathable garments, and blood pressure cuffs.

Because fastener product 30d is molded under pressure in nip 11d and doesn't require additional processing (e.g., cutting or stretching) for forming the net-like openings 71, the openings can be configured in a wide variety of shapes and sizes, providing the fastener product 30d with a desirable porosity and flexibility.

Figure 15B:
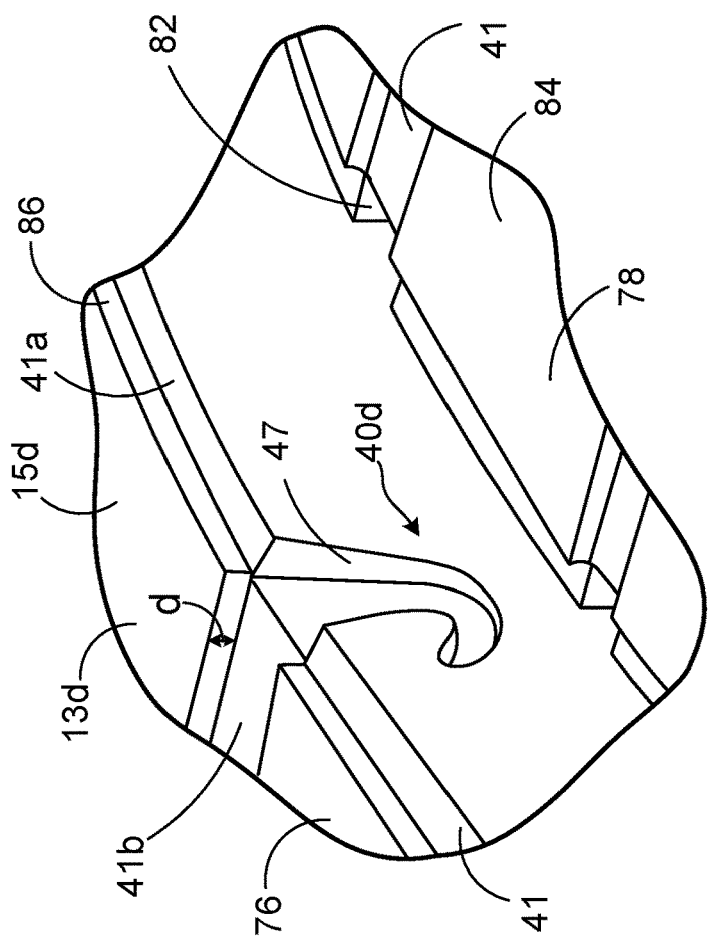
FIG. 15B is a perspective, exploded view of a section of the mold roll in FIG. 14, showing a mold cavity and surface channels.
Figure 15A:
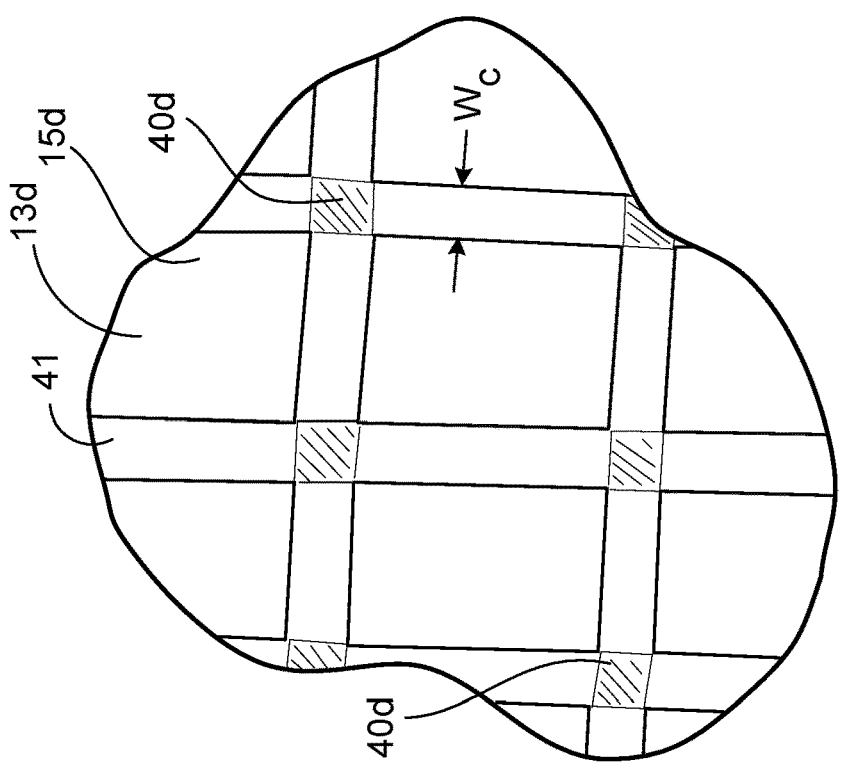
FIG. 15A is an enlarged, partial front view of a surface of the mold roll in FIG. 14, showing mold cavities interconnected by surface channels.

Referring now to FIG. 15B, an exploded view of two mold roll rings 76 and 78 is shown, with the rings spaced apart to view one of the molding cavities. Mold roll 14d is formed of multiple rings stacked and disposed about a mandrel (not shown), which keeps the rings tightly coupled to one another. Rings 76 and 78 cooperate to define multiple fastener-shaped (e.g., hook-shaped) molding cavities 40d. In this example, first ring 78 cooperates with second ring 76 (e.g., when the rings are pressed together) to define mold cavities 40d and surface channels 41. Rings 76 and 78 are stacked together such as to leave a gap between both rings sufficiently small to prevent resin from entering such gap. When assembled, peripheral surface 84 of rings 76 and 78 help define the outer surface 15d of mold roll 14d. The surface channels include peripheral channels 41a and transverse channels 41b that intersect at multiple points. The channels may be formed by aligned recesses in the rings. The depth 'd' of surface channels 41 is generally between 0.02 and 0.5 millimeters, with hook cavities extending another 0.19 to 2.5 millimeters deeper than the surface channels. The dimensions (e.g., depth and width) of the channels may vary, for example, to match cavities of different shapes or to increase the thickness of the product. Additionally, the configuration of the channels 41 may be other than a square configuration (i.e., which forms a square netting product), such as a diamond configuration, or any polygonal configuration, in order to form products with a different netting configuration.

Figure 16A:
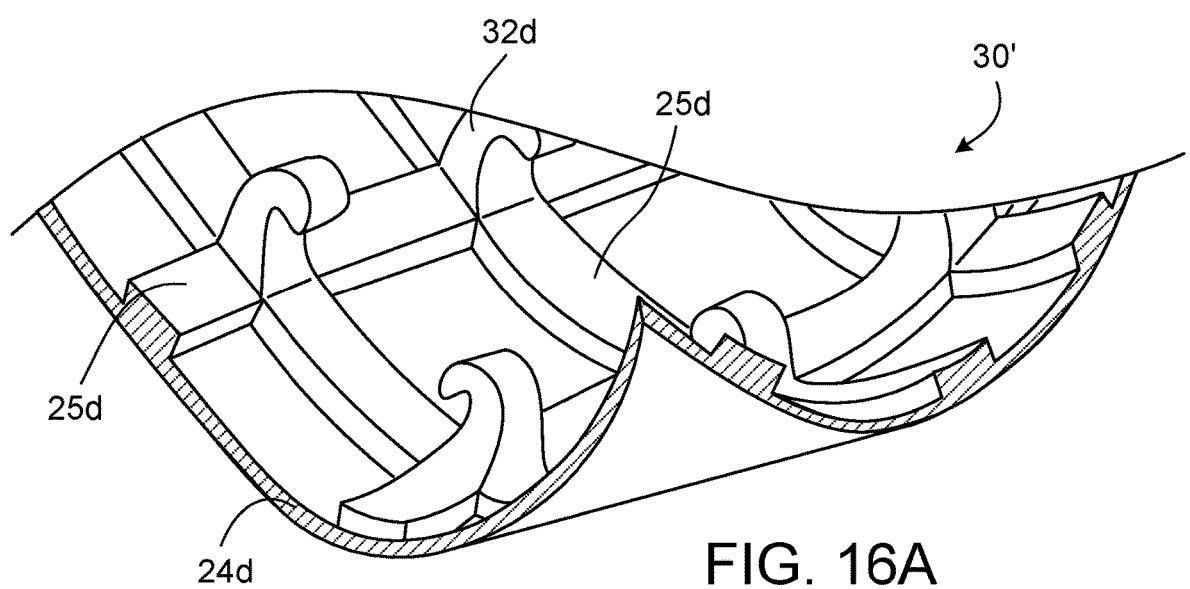
FIG. 16A is a perspective view of a portion of a second fastening product formed in the molding apparatus in FIG. 14.
Figure 17A:
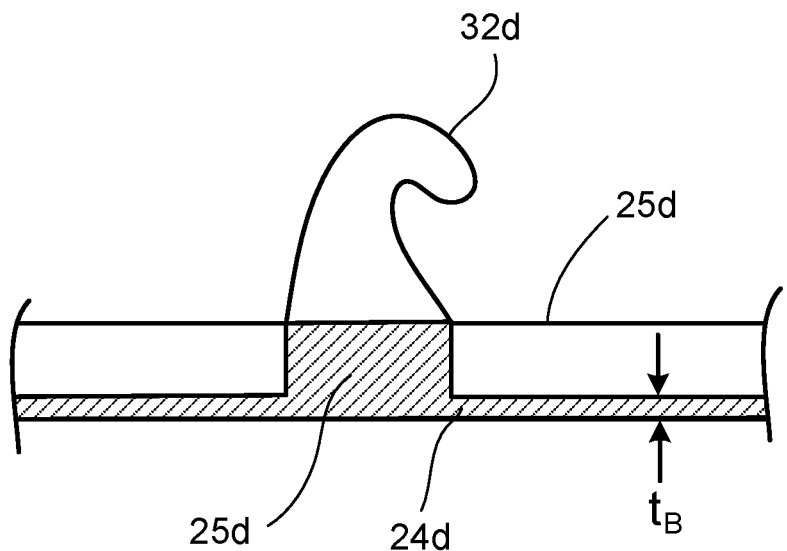
FIG. 17A is a side, cross-section view of a portion of the second fastening product in FIG. 16A, showing a fastener element and threads extending from a resin base.
Figure 17B:
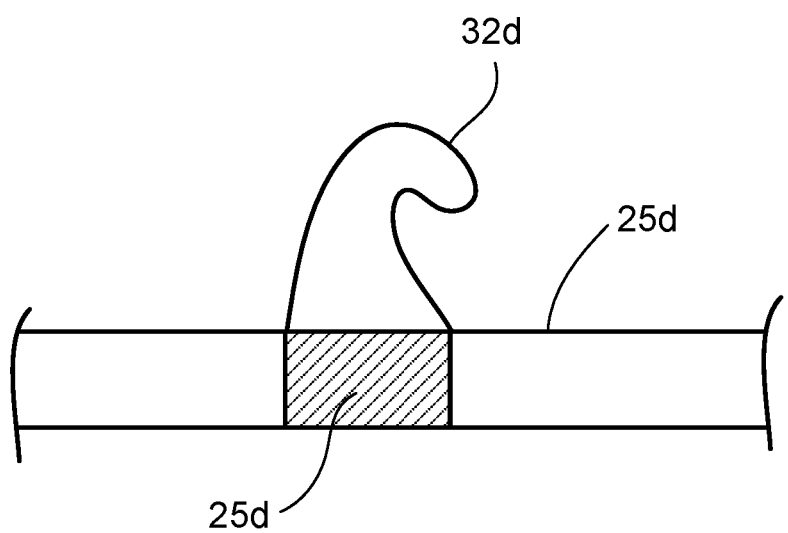
FIG. 17B is a side, cross-section view of a portion of the second fastening product in FIG. 16A, with the resin base removed.

Referring back to FIG. 14, a heating device 87 may be alternatively used to form the fastener product 30d shown in FIG. 16. Heating device 87 may be used in absence of wiper 70, with the molding process carried out such that a film of resin is left on the raised surfaces 15d of the mold roll to solidify and become integral with resin threads 25d, as shown in FIG. 16A. Thus, FIG. 16A depicts a product 30' formed when resin base 24d is not removed by wiper 70 or pressure shoe 12d. In fastening product 30', the resin threads 25d extend from a thin resin base 24d. Referring also to FIG. 17A, resin base 24d has a thickness '$t_B$' of approximately 0.025 millimeters. As shown in FIG. 14, heating device 87 is positioned to apply heat from a side of the fastener product 30' opposite the fastener elements 32d. Heating device 87 is disposed downstream of the take-off roll 18d, arranged to melt (e.g., by flame treatment) the resin base between the threads, leaving only the threads 25d and hooks 32d, as shown in FIGS. 17B and 16.

Figure 18:
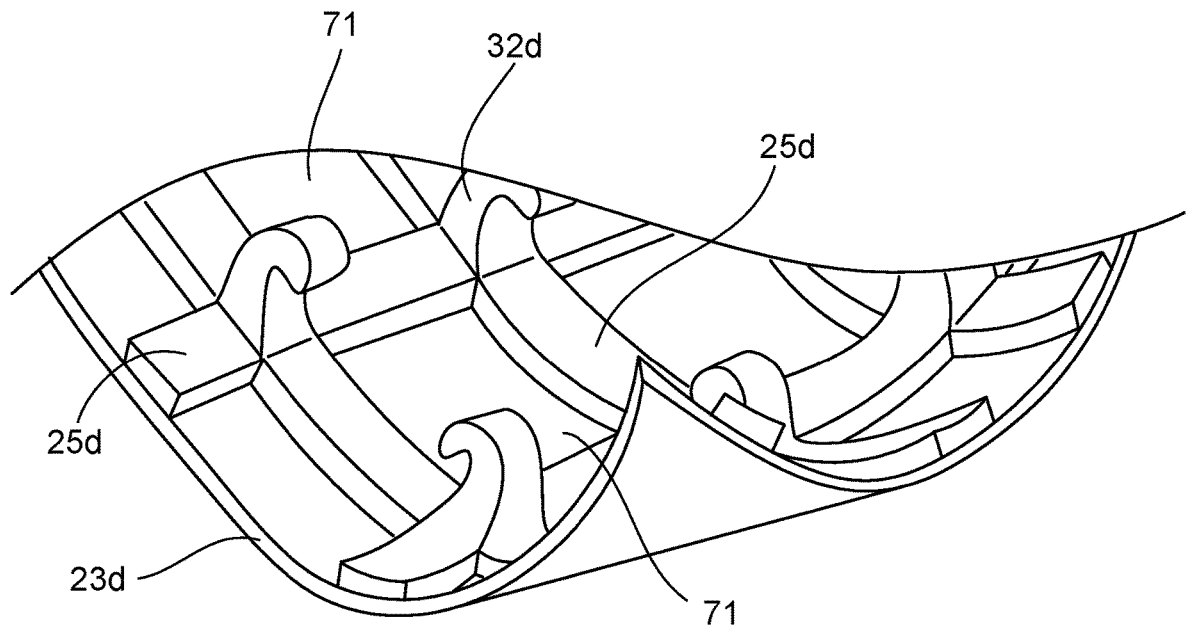
FIG. 18 is a perspective view of a portion of a third fastening product formed in the molding apparatus in FIG. 14.

Referring back to FIG. 14, a pressure roll 20d may be used to laminate a substrate 23d to the resin disposed in the surface channels of the mold roll. Pressure roll 20d forms a nip with mold roll 14d downstream of molding nip 11d, and is configured to laminate the substrate to the resin in the channels after the resin base 24d has been removed from the mold roll 14d. In a preferred embodiment, pressure roll 20d features a compliant surface made, for example, of a resilient external layer such as urethane elastomer. The compliance of the relatively soft surface of pressure roll 20d results in a relatively wide contact area between the pressure roll and the mold roll 14d, and helps to slightly push the substrate into the surface channels 41, allowing the substrate to be firmly laminated to the resin in the surface channels 41. After substrate 23d is laminated to the resin and the resin is allowed to solidify, the substrate and resin are stripped together from the molding surface by take-off roll 18d in the form of a web laminated to a substrate, as shown in FIG. 18. FIG. 18 depicts the continuous web of resin threads 25d laminated to the substrate 23d, with the apertures 71 between the threads being covered by substrate 23d.

Figure 19:
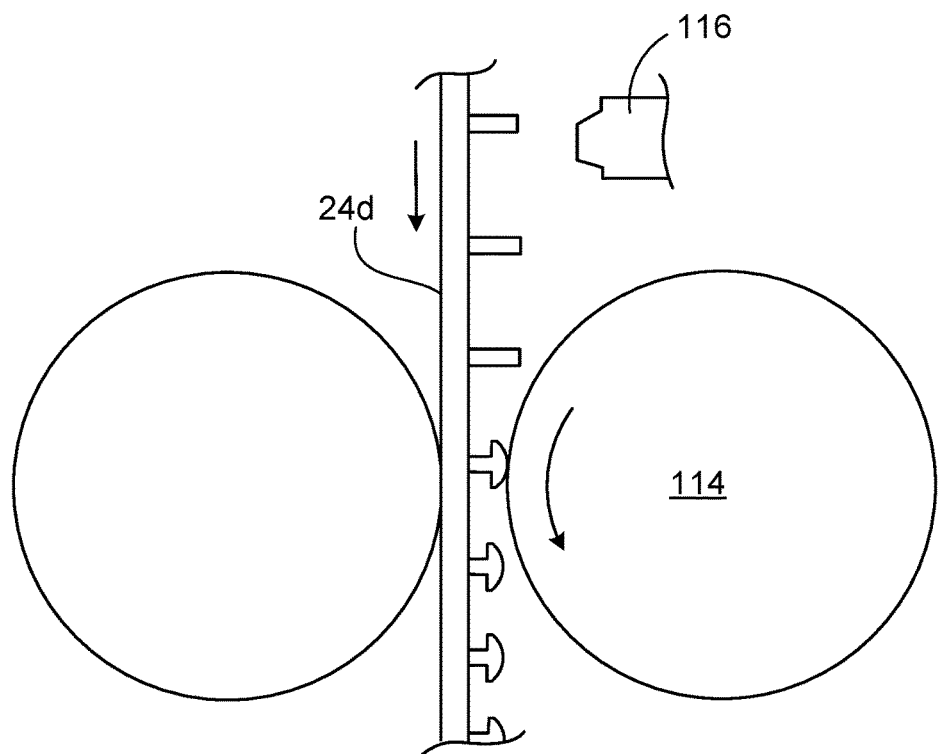
FIG. 19 is a schematic view of an apparatus for deforming resin stems.

Referring now to FIG. 19, fastener elements may also be formed by deforming stems of resin after stripping the stems from the molding cavities. For examples, the cavities of the mold roll may have only a stem forming portion, configured to form stems that extend from the resin base 24d. The stems can then be post-treated to form engaging heads. For example, after molding and stripping the product from the mold roll, the tops of the molded stems can be deformed by pressing against a heated pressure roller 114, or first heated by a heater 116 and then pressed against a chilled pressure roller 114, to create discs or other shapes that overhang the base of the product and are capable of engaging, e.g., loop material or like fastener elements.

Figure 20:
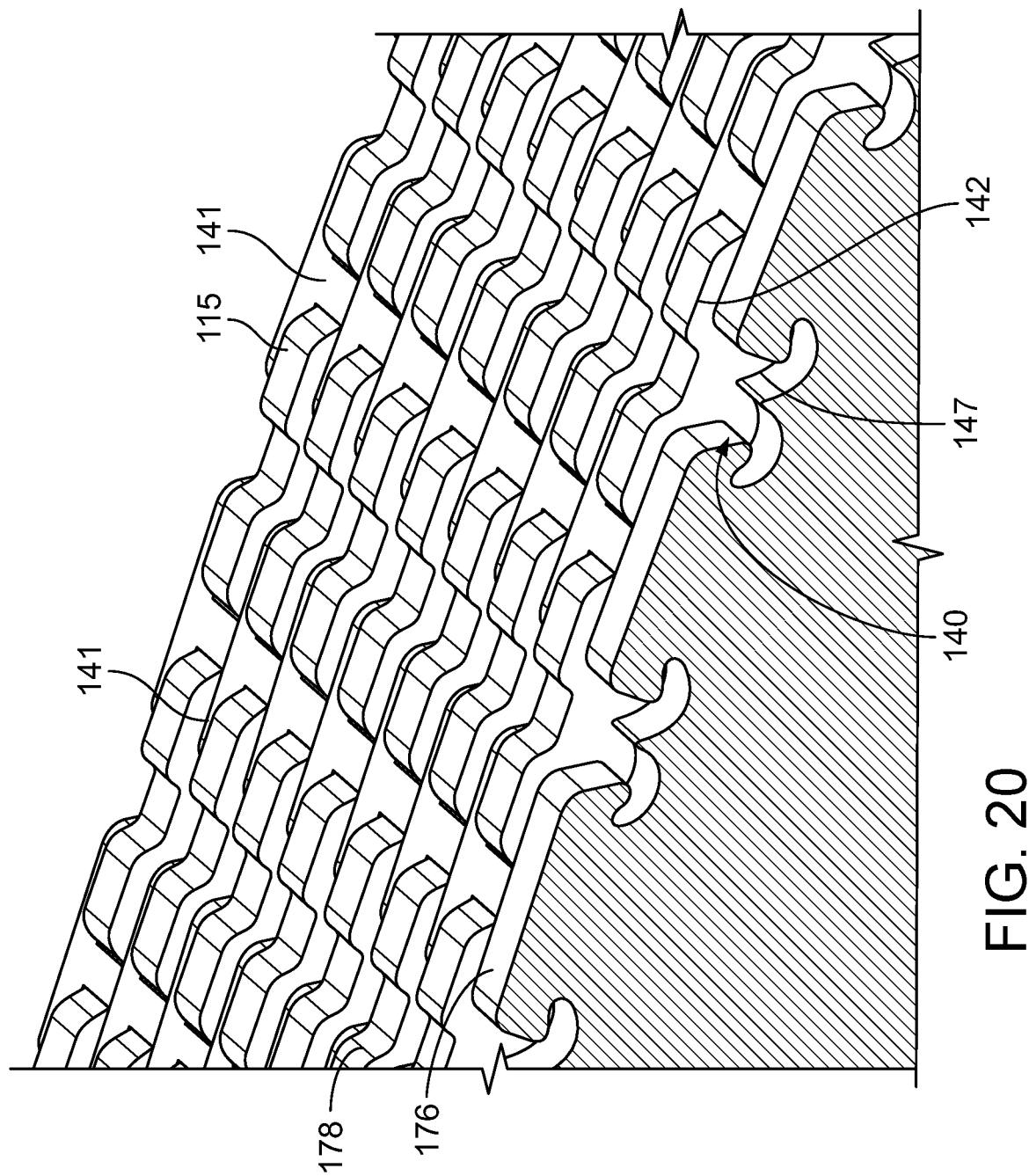
FIG. 20 is a perspective, cross-section view of a second configuration of the mold roll in FIG. 14, showing mold cavities and surface channels.
Figure 21:
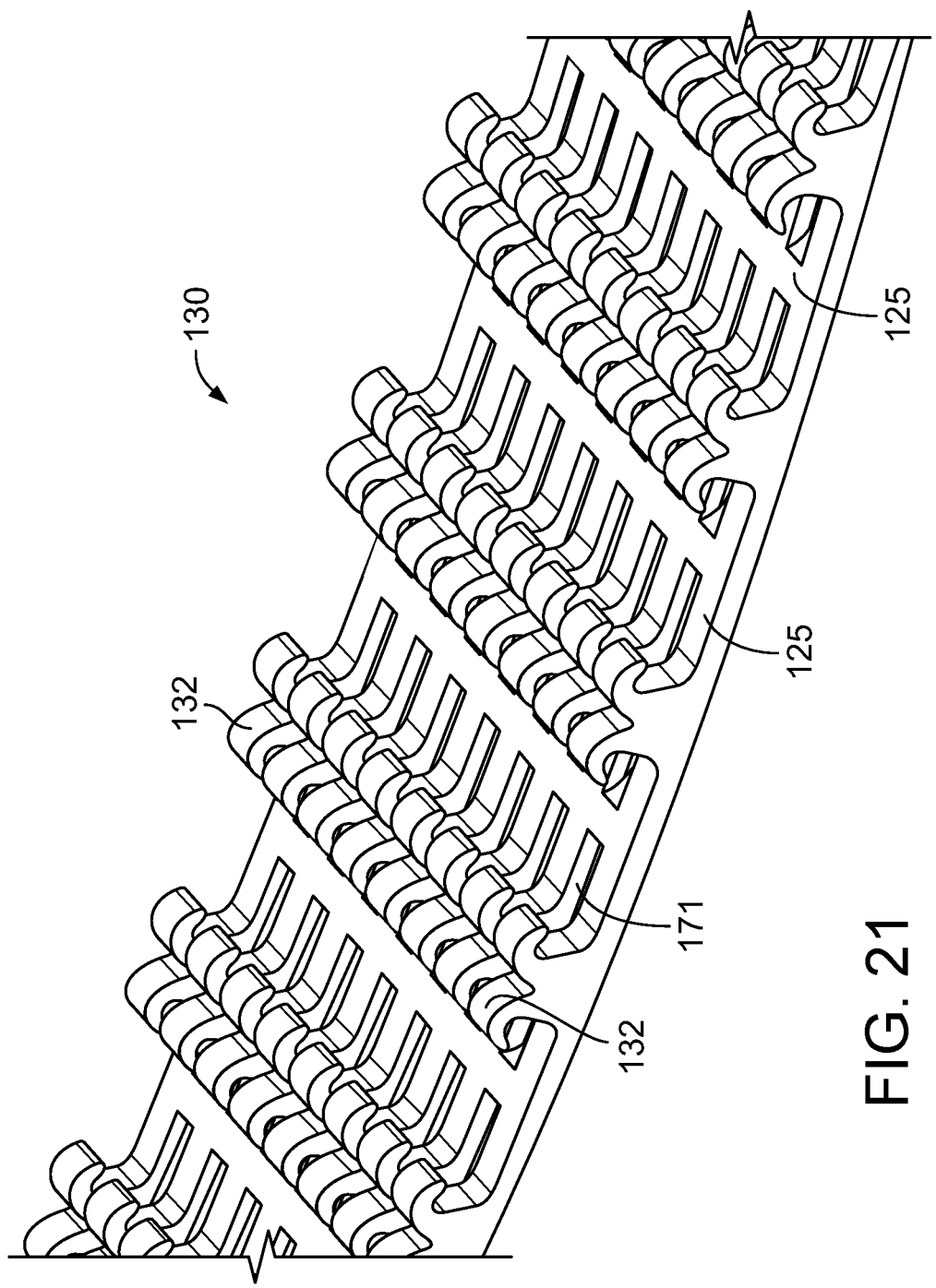
FIG. 21 is a perspective view of a portion of a fastening product formed using the mold roll in FIG. 20.

Referring to FIGS. 20 and 21, a different configuration of the mold roll 14d and product shown in FIG. 14 is formed of hook rings 176 and spacer rings 178. Similar to the rings shown in FIG. 15B, hook rings 176 define the mold cavities 140 of the mold roll illustrated in FIG. 20. Each hook ring 176 has a first side surface that defines recesses 147 in form of fastener hooks. Each hook ring is sandwiched between two spacer rings 178 that defines raised edge regions 142 that form part of the outer surface of the mold roll. Valleys formed between aligned raised edge regions of the spacer rings, and the edges of the mold rings 176, define the channels 141 that form the resin threads 125 of the fastening product 130 shown in FIG. 21. Fastening product 130 is a continuous web similar to the product in FIG. 16. Fastening product 130 defines fastener elements 132 in the shape of mold cavities 140, extending from resin threads 125. The apertures 171 of product 130 are formed by the raised edge portions of the spacer rings.

While a number of examples have been described for illustration purposes, the foregoing description is not intended to limit the scope of the invention, which is defined by the scope of the appended claims. There are and will be other examples and modifications within the scope of the following claims.

What is claimed is:

1. A method of molding resin, the method comprising:
   introducing resin to a pressure zone defined between a movable molding surface and a reaction surface, the molding surface defining an array of molding cavities extending from a periphery of the molding surface;
   forcing the resin into the molding cavities to mold resin projections extending from a resin base; and then
   stripping the resin from the molding surface;
   wherein the resin is introduced under conditions that cause a bead of the resin to form between the molding surface and the reaction surface just upstream of the pressure zone, and to rotate toward the molding surface, from which rotating resin bead resin is steadily drawn into the pressure zone by operation of the moving molding surface.

2. The method of claim 1, wherein the resin is molten as introduced.

3. The method of claim 1, wherein rotation of the bead of resin is caused by a velocity gradient within the resin between the molding surface and the reaction surface.

4. The method of claim 1, wherein the bead of resin has an outer surface exposed to atmospheric pressure.

5. The method of claim 1, wherein the reaction surface is stationary.

6. The method of claim 5, wherein the reaction surface comprises a pressure shoe.

7. The method of claim 6, wherein the pressure shoe comprises a cantilevered compliant blade with one end fixed and a second end flexed under pressure in the pressure zone.

8. The method of claim 1, wherein the bead is of an asymmetric shape.

9. The method of claim 1, wherein the resin is introduced by being dropped as a molten resin stream into a nip formed between the molding surface and the reaction surface, and wherein the resin stream curves toward the molding surface as it nears the nip.

10. The method of claim 1, further comprising introducing a substrate to an exposed surface of the resin base before the resin is stripped from the molding surface.

11. The method of claim 10, wherein the substrate is introduced under conditions that cause the substrate to become permanently laminated to the base.

12. The method of claim 10, wherein the substrate is introduced under conditions that cause the substrate to become at least partially melted by heat from the base.

13. The method of claim 1, wherein the resin base has a substantially uniform thickness of less than 0.075 millimeters.

14. The method of claim 1, wherein the reaction surface comprises multiple reaction surface portions spaced along a width of the molding surface and defining respective pressure zones with the molding surface.

15. The method of claim 14, wherein introducing the resin comprises introducing separate streams of resin, with each stream of resin introduced to a respective one of the pressure zones.

16. The method of claim 1, wherein the resin is forced into the cavities in the pressure zone.

17. The method of claim 1, wherein the resin is forced into the cavities in a pressure nip formed between the molding surface and a pressure roll downstream of the pressure zone.

18. The method of claim 1, wherein the projections comprise discrete loop-engageable fastener elements.

19. The method of claim 1, wherein the movable molding surface comprises a mold roll.

20. A method of molding resin, the method comprising:
   introducing resin to a pressure zone defined between a movable molding surface and a reaction surface, the molding surface defining an array of molding cavities extending from a periphery of the molding surface;
   forcing the resin into the molding cavities to mold resin projections extending from a resin base; and then
   stripping the resin from the molding surface;
   wherein the resin is introduced under conditions that cause a bead of the resin to form under atmospheric pressure between the molding surface and the reaction surface just upstream of the pressure zone, while the movable molding surface is driven to create a velocity gradient within the resin between the molding surface and the reaction surface.

21. The method of claim 20, wherein the resin is molten as introduced.

22. The method of claim 20, wherein the reaction surface is stationary.

23. The method of claim 20, further comprising introducing a substrate to an exposed surface of the resin base before the resin is stripped from the molding surface.

24. The method of claim 20, wherein the projections comprise discrete loop-engageable fastener elements.

25. The method of claim 20, wherein the movable molding surface comprises a mold roll.

\* \* \* \* \*